United States Patent [19]

Marenin

[11] 4,339,793
[45] Jul. 13, 1982

[54] FUNCTION INTEGRATED, SHARED ALU PROCESSOR APPARATUS AND METHOD

[75] Inventor: George B. Marenin, San Jose, Calif.

[73] Assignee: International Business Machines Corporation, Armonk, N.Y.

[21] Appl. No.: 68,028

[22] Filed: Aug. 20, 1979

Related U.S. Application Data

[62] Division of Ser. No. 754,193, Dec. 27, 1976, Pat. No. 4,181,934.

[51] Int. Cl.³ ............................................. G06F 3/00
[52] U.S. Cl. .................................................. 364/200
[58] Field of Search ......................... 364/200 MS File

[56] References Cited

U.S. PATENT DOCUMENTS

| | | | |
|---|---|---|---|
| 3,061,192 | 10/1962 | Terzian | 364/200 |
| 3,215,987 | 11/1965 | Terzian | 364/200 |
| 3,462,744 | 8/1969 | Tomasulo et al. | 364/200 |
| 3,544,969 | 12/1970 | Rakoczi et al. | 364/200 |
| 3,614,740 | 10/1971 | Delagi et al. | 364/200 |
| 3,614,741 | 10/1971 | McFarland, Jr. et al. | 364/200 |
| 3,668,651 | 6/1972 | Hornung | 364/200 |
| 3,680,054 | 7/1972 | Bunker et al. | 364/200 |
| 3,710,324 | 1/1973 | Cohen et al. | 364/200 |
| 3,725,871 | 4/1973 | Heuttner et al. | 364/200 |
| 3,795,901 | 3/1974 | Boehm et al. | 364/200 |
| 3,909,790 | 9/1975 | Shapiro et al. | 364/200 |
| 3,938,078 | 2/1976 | Garlic | 364/200 |
| 3,943,495 | 3/1976 | Garlic | 364/200 |
| 3,962,682 | 6/1976 | Bennett | 364/200 |
| 3,969,724 | 7/1976 | Anderson et al. | 364/200 |
| 3,972,023 | 7/1976 | Bodner et al. | 364/200 |
| 3,986,170 | 10/1976 | Valassis et al. | 364/200 |
| 4,004,281 | 1/1977 | Bennet et al. | 364/200 |
| 4,004,283 | 1/1977 | Bennett et al. | 364/200 |
| 4,034,349 | 7/1977 | Monaco et al. | 364/200 |
| 4,038,641 | 7/1977 | Bouknecht et al. | 364/200 |
| 4,056,847 | 11/1977 | Marcantonio | 364/200 |
| 4,078,254 | 3/1978 | Beausoleil et al. | 364/900 |
| 4,148,098 | 4/1979 | McCreight et al. | 364/200 |
| 4,155,118 | 5/1979 | Lamiaux | 364/200 |

*Primary Examiner*—Gareth D. Shaw
*Assistant Examiner*—Thomas M. Heckler
*Attorney, Agent, or Firm*—Shelley M. Beckstrand

[57] ABSTRACT

A computing system architecture includes a central processing unit having a channel, arithmetic and logic unit, a plurality of working registers, and control logic; a plurality of local storage registers; a main storage; an executable control store; one or more input/output devices; and a multiplexed cycle steal and interrupt request common poll bus.

The storage and input/output devices communicate with and are controlled by the central processing unit over a looped, or unidirectional bus and control channel including a bus in, a bus out, an address and control bus, and a plurality of control lines. Bus out is operated to address the executable control store and main storage, and to provide data to the input/output devices and the local storage registers. Bus in is shared by the input/output devices and all storage devices and registers for transferring data and control information to the central processing unit. Bus in is also used by main storage to receive data from the input/output devices and from the local storage registers. The address and control bus addresses the input/output devices and the local storage registers, thus enabling overlapping of device or local storage data transfers with the accessing of executable control storage and main storage, and with instruction execution.

The arithmetic and logic unit is time shared for data and input/output processing, register/register and storage/register transfers, shift operations, byte manipulations, and address modification.

17 Claims, 16 Drawing Figures

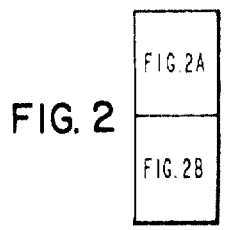
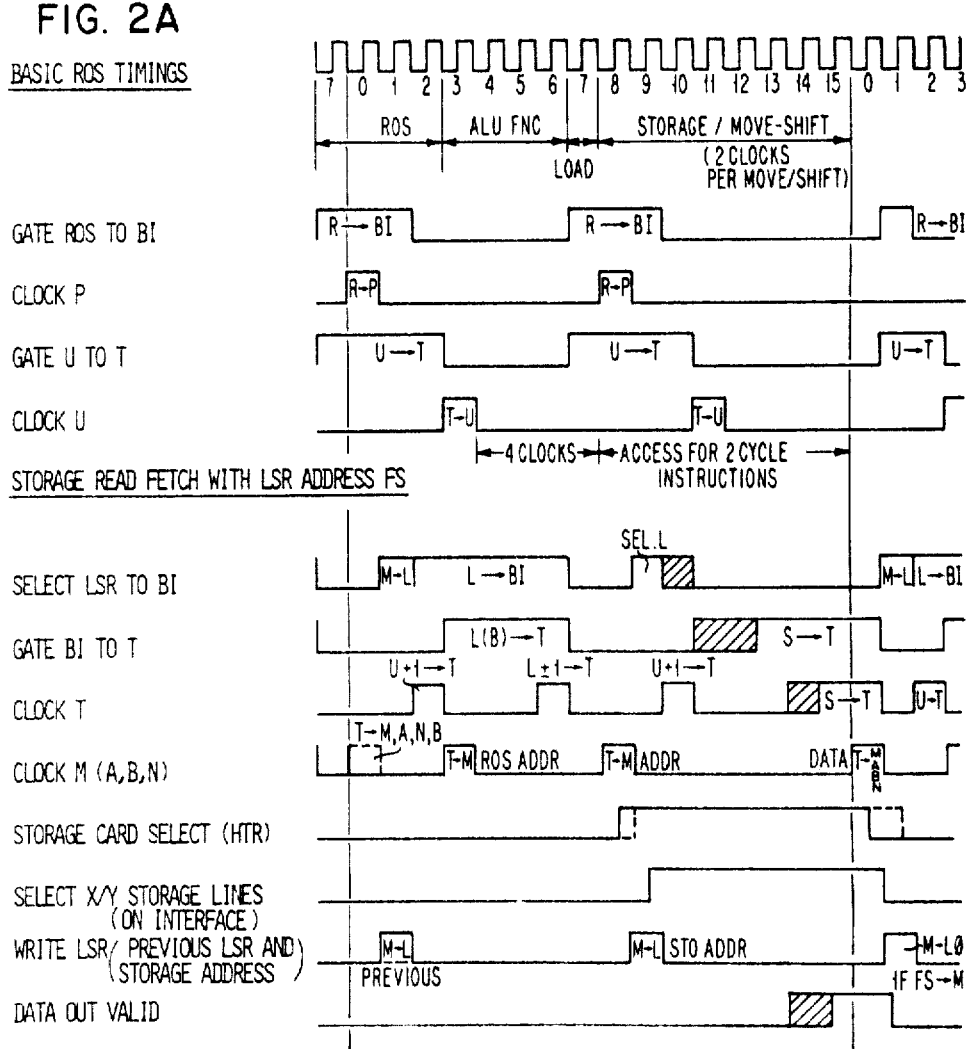

STORAGE READ FETCH WITH OPR ADDRESS (FS)

STORAGE WRITE LOGICAL WRITE STORAGE (LW)

BASIC ROS TIMINGS

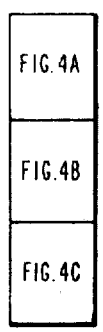
FIG. 4
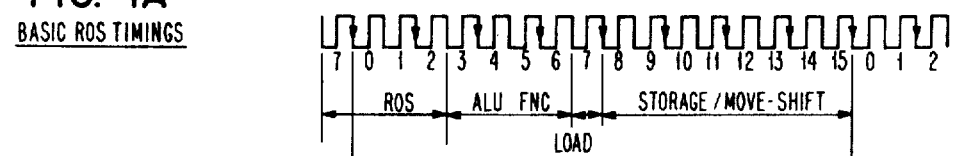

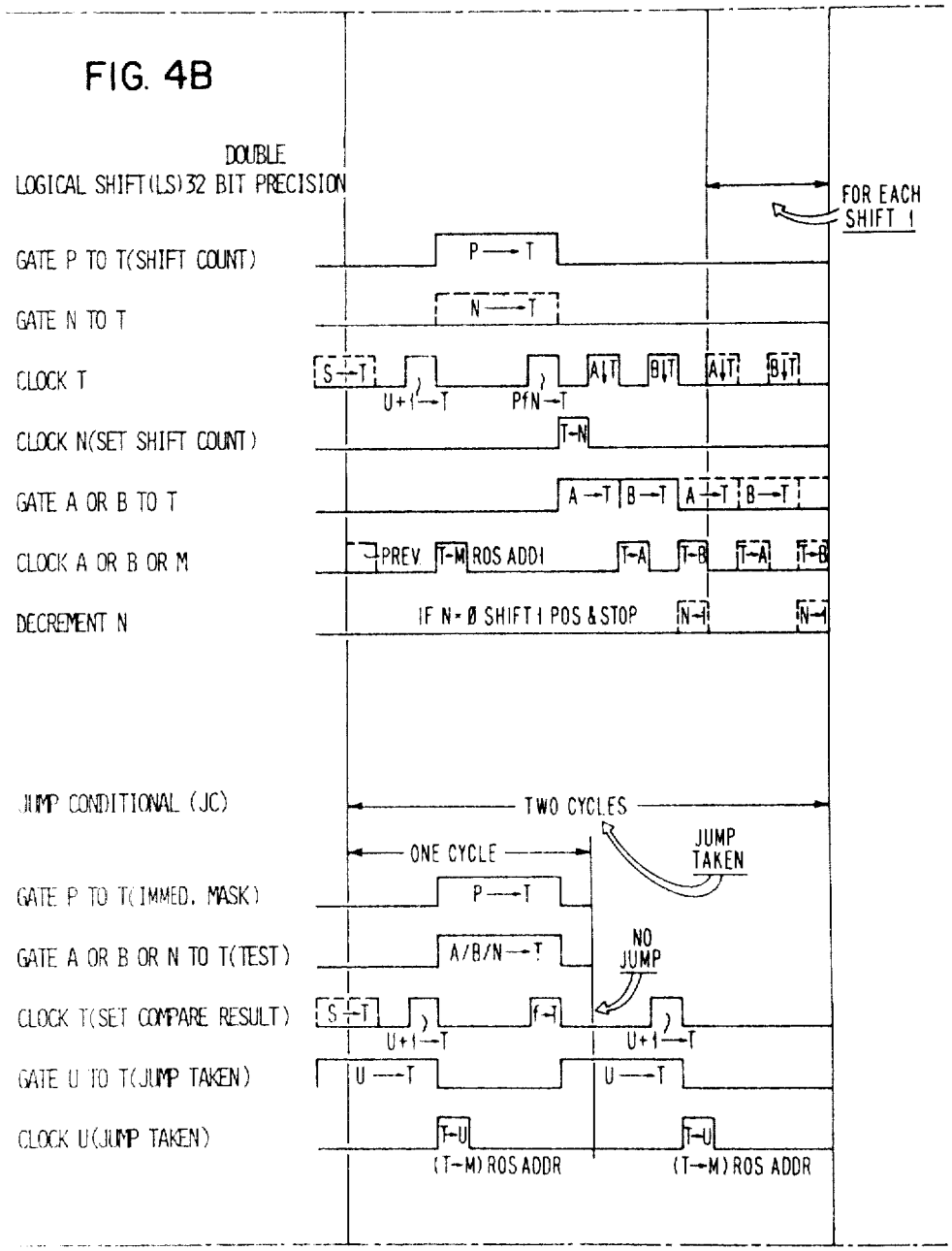

FUNCTION INTEGRATED, SHARED ALU PROCESSOR APPARATUS AND METHOD

This is a division, of application Ser. No. 754193 filed Dec. 27, 1976, now U.S. Pat. No. 4,181,934.

CROSS REFERENCES TO RELATED APPLICATIONS

Unidirectional Looped Busses Microcomputer Architecture, U.S. Pat. Ser. No. 754,462, filed Dec. 27, 1976 by George Bohoslaw Marenin and Edward David Finnegan abandoned.

BACKGROUND OF THE INVENTION

1. Field of the Invention

This invention relates to digital computer memory systems and other data processing systems.

The invention further relates to a cycle steal and interrupt request channel including a common poll bus, and to a function integrated and shared arithmetic and logic unit processor architecture.

2. Description of the Prior Art

State of the art microprocessor designs provide three or four basic and separate functional components. First is the ROS (sometimes RAM) microinstruction address register with its incrementing, branching and linking hardware. Second is the central arithmetic and logic unit (ALU) with its associated registers and data paths. Third is the addressing and data interconnection with the main storage, that is usually treated as input/output (I/O) unit, and is architecturally combined with other system I/O devices. If the microprocessor is sophisticated enough, it will also include a fourth separate section of registers and data paths, usually defined as a channel, for performing priority nested interrupts switching, and optionally, priority multiplexed or burst mode cycle steal control (sometimes referred to as direct memory access, or DMA.)

Current microprocessors can be classified into two approaches that divide the above noted functions into a multi-chip set. The first approach allocates different functions to separate chips such as an ALU chip, a control chip, an address chip, an I/O chip, and ROS/RAM (sometimes with address control) storage chips. The second approach distributes processor functions through a number of identical chips: this approach is known as the "bit slice technique," and usually requires separate I/O control chips.

Either approach requires extensive chip interconnection, which is limited by the available I/O pins and, consequently results in duplication of logic, and also delays through the required off-chip drivers and receivers. If the data or address busses are bidirectional, no signals may be sent or received until an all off and then an all on control state is established between each chip's drivers and receivers; this causes additional delays. Also, each of these bidirectional busses require I/O pins and off chip drivers, resulting in a larger chip layout and, even worse, a higher chip power dissipation. To overcome this drawback, some architectures combine the address and data busses into one time multiplexed "Unibus," compounding further the controls and handshaking delays.

Consequently, a microprocessor architecture which minimizes the number of drivers and receivers and which can be packaged on a single chip having about 68 pin connections is needed to optimize cost and performance.

In existing computer technology, channels with up to 8 nested interrupt levels and 8 cycle steal priority levels with associated data paths, registers and buffers are extremely complex, and generally separated from the central processor on a separate chip. This is because they generally require 600 to 700 logic gates, which is nearly equivalent in logic hardware to an 8 bit microprocessor.

In accordance with this invention there is provided a microcomputer architecture including in the central processor an arithmetic and logic unit which is time shared for data processing, input/output processing, transfers of data between registers, and storage and registers, shift operations, byte manipulations, and address register modifications.

This invention further provides a microcomputer architecture including a common poll bus and control logic for enabling cycle steals and interrupt requests.

This invention further provides a plurality of stacks of working operand registers, each stack selectable by the executing interrupt level, and with absolute stack addressing by selecting the page equivalent to interrupt level.

In accordance with another aspect of this invention, there is provided, in connection with an unidirectional looped bus, address register means for addressing storage. During a portion of an execution cycle, the arithmetic and logic unit modifies the contents of the address register, the results being returned to the address register and also loaded onto the bus out for addressing storage. The invention further provides local storage register means for storing the storage address loaded on the bus out for use as a return pointer from an interrupt.

The invention still further provides, for use in a direct memory accessing (or cycle stealing) operation, local storage register means for storing indirect main storage addresses. The indirect storage address is automatically incremented, unless inhibited by the controlling I/O device, through the arithmetic and logic unit on the way to the output bus as a temporary pointer to write into main storage the data from the input/output means on bus in; or, as a temporary pointer to access main storage data for loading onto the input bus, and thence through the arithmetic and logic unit to the output bus for receipt by an input/output device.

In accordance with another aspect of the invention, particularly for use when the microprocessor of the invention is used for emulating a different computing apparatus, operand register means are provided for storing the operation code of the instruction being emulated. The arithmetic and logic unit is operated to add the operation code being emulated to the contents of the instruction address register means, the result being placed on the output bus as a displacement pointer to a table in the executable storage means, which table provides an immediate pointer to the microinstruction routine in the executable storage means for executing the operation code being emulated.

In accordance with a further aspect of the invention, a common interrupt and cycle steals polling bus means is provided. Control means, responsive to a request for an allowed interrupt, is provided for causing the change of microinstruction address pointers: the current instruction address being transferred from the address register means into the local storage register location pertaining to the current interrupt level, and the instruction address pertaining to the new interrupt level being transferred into the address register means from the local storage register accessed by the new interrupt level code.

In accordance with yet another aspect of the invention, means are provided for detecting a cycle steal request on said common poll bus. After the poll bus has been cleared of interrupt requests, the cycle steal priority is obtained from the common poll bus, and used to address the corresponding local storage register for loading into the address register means the indirect main storage address. The indirect main storage address may be incremented to either store or fetch data from the input/output device under control of the microprocessor, without requiring timing or address information from the input/output device.

BRIEF DESCRIPTION OF THE DRAWINGS

FIG. 1 illustrates the manner in which FIGS. 1a, 1b, and 1c are related; FIGS. 1a, 1b, and 1c show a logic diagram of the microcomputer architecture of the invention.

FIGS. 2a, 2b, 2c, 3a, 3b, 3c, 4a, 4b, and 4c are timing diagrams illustrating the execution of a basic instruction set adaptable to the microcomputing system architecture of the invention. FIGS. 2, 3, and 4 illustrate the relationship between these timing diagrams.

DESCRIPTION OF THE PREFERRED EMBODIMENTS

Figures 1, 1A:
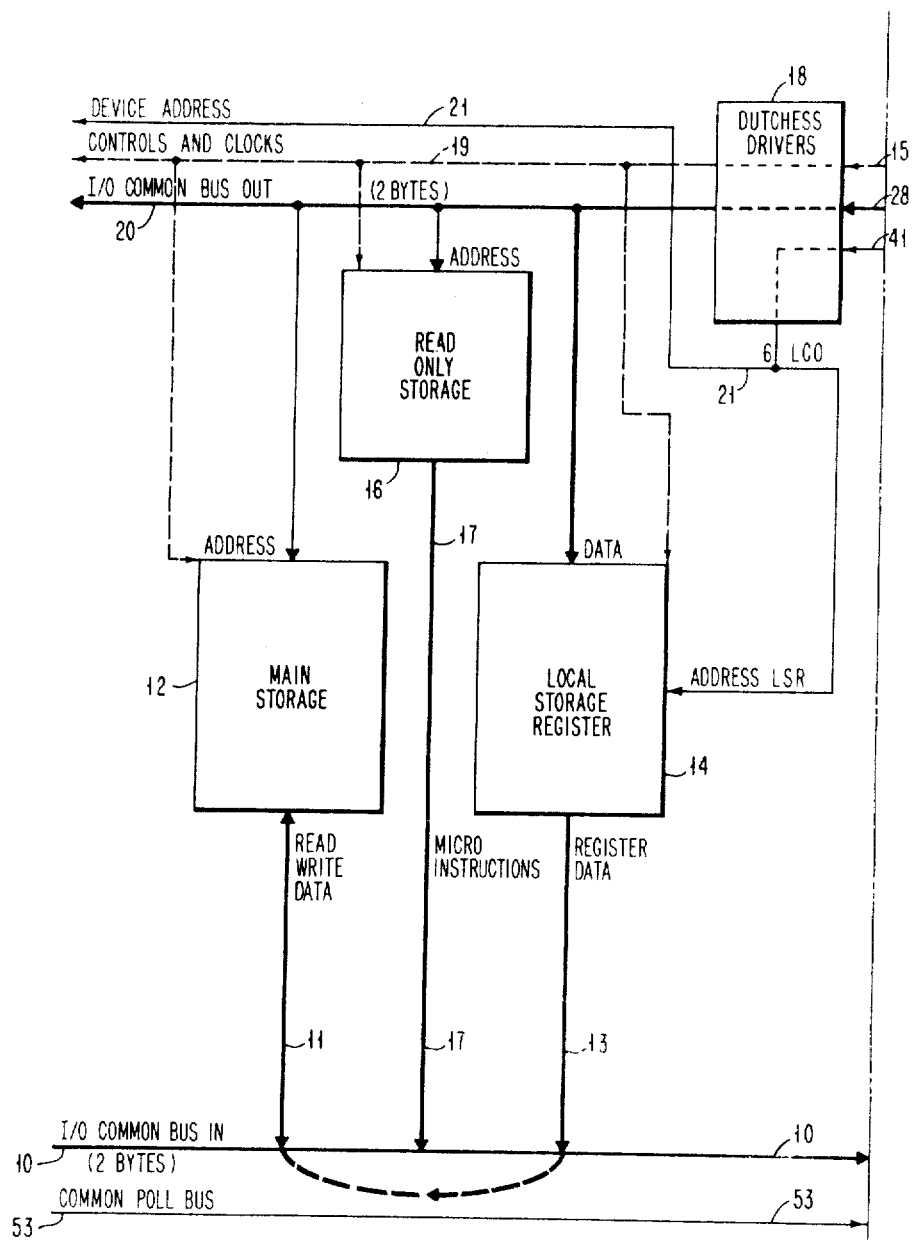
Figure 1B:
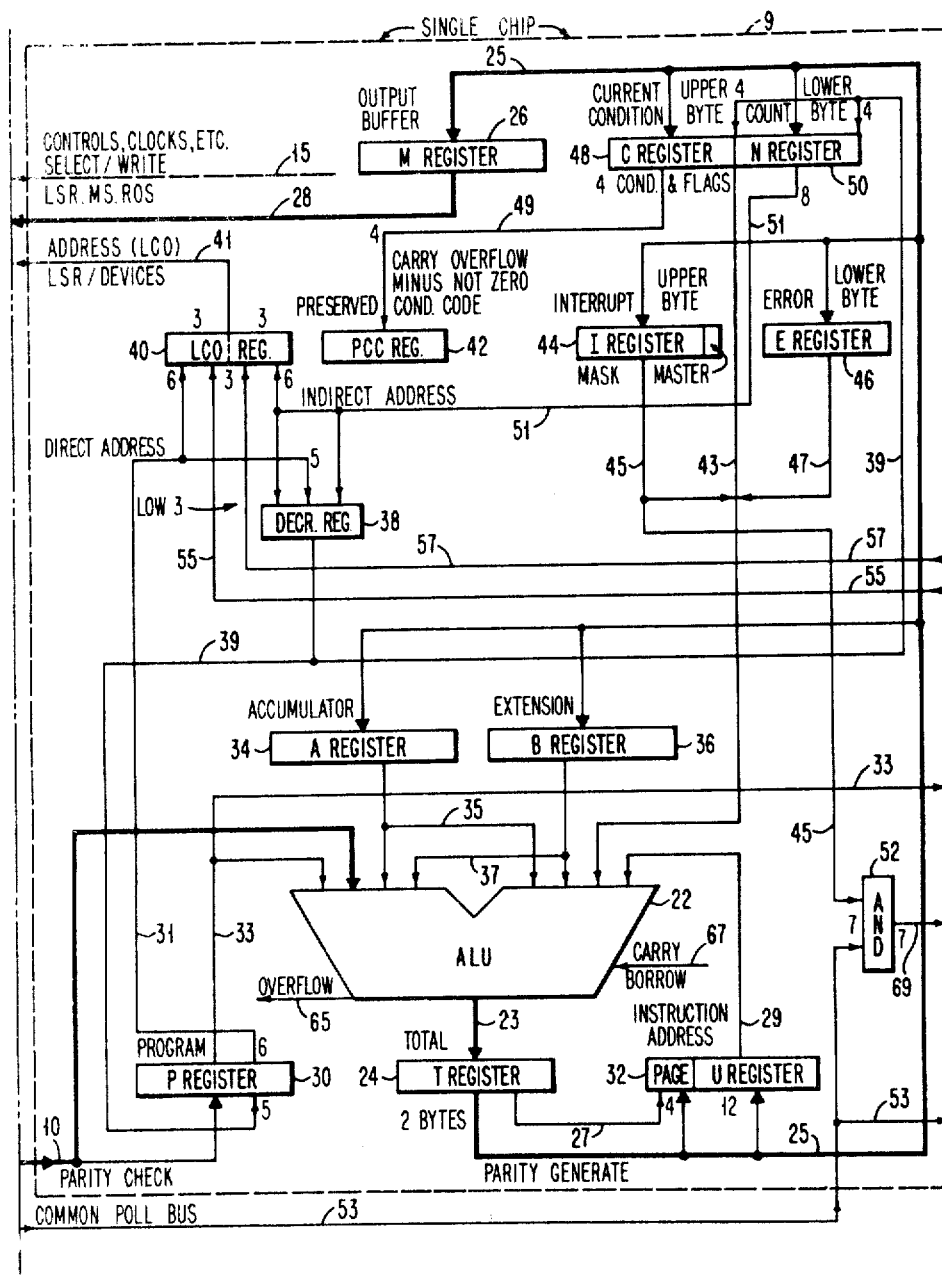
Figure 1C:
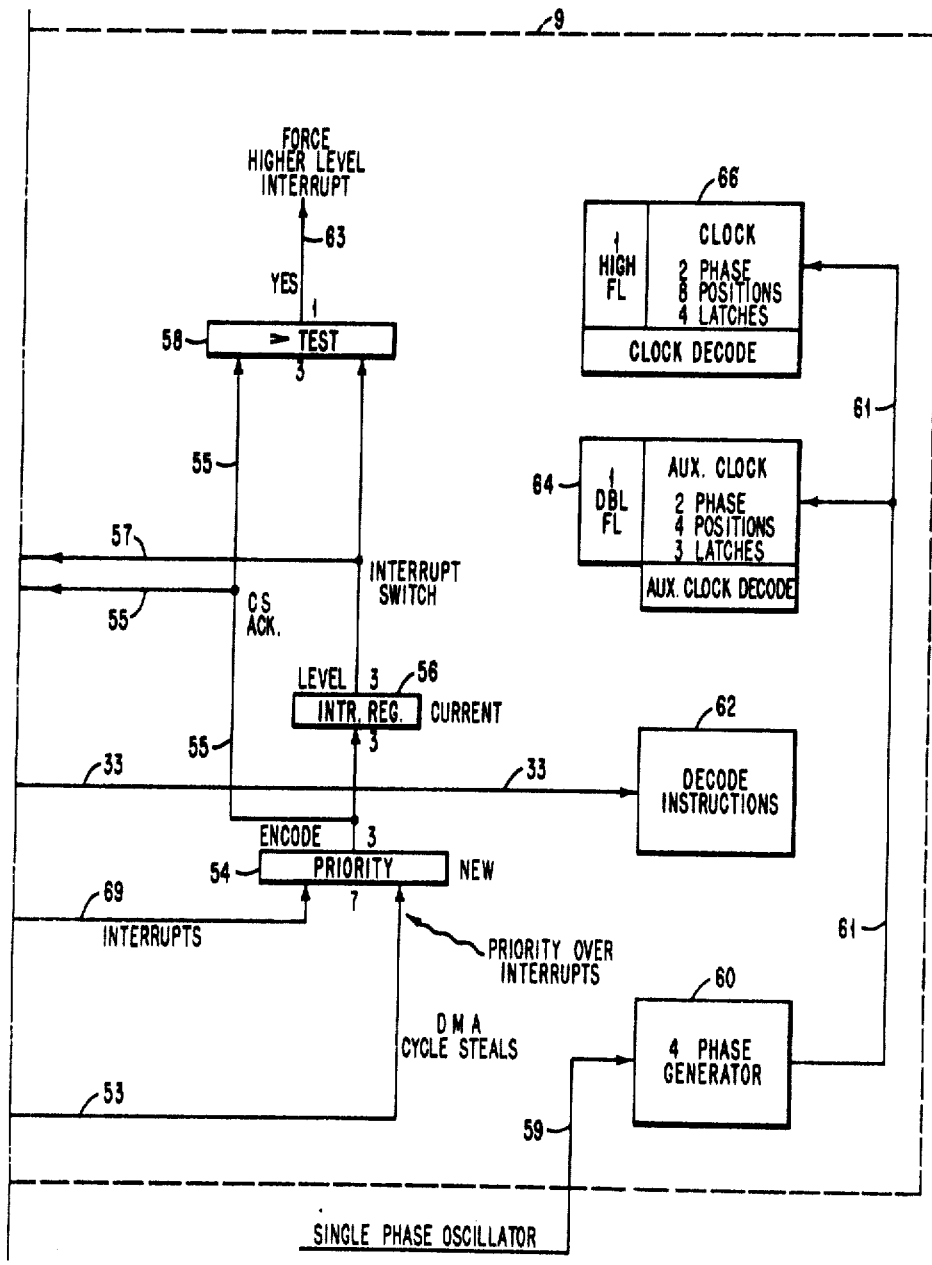

Referring now to the drawings, particularly FIG. 1, the architecture of the computing system of the invention will be described. The four major physical units of the system shown in FIG. 1 are the following:
1. Central processing unit (CPU) 9, including the arithmetic and Logical Unit 22, a channel (including Bus In 10, Bus Out 20, Address Bus 21, Common Poll Bus 53, and Control Lines 15,) a plurality of working registers, and control logic.
2. Local Storage Registers 14.
3. Main Storage 12.
4. Read Only Storage (ROS) 16, sometimes referred to as Executable Storage 16 or Microprogram Store 16.

CPU 13 may be implemented, for example, as a single LSI chip, mounted in today's technology into a package requiring less than 70 module I/O pins. This CPU package may be mounted, in currently available technology, on a card together with one Read Only Store 16 module, one Local Store 14 module (having, say, 32 registers), two modules for support drivers 18, and an oscillator (shown by output line 59.) A small portion of Main Storage 12 may also be mounted on this card. However, it is expected that, utilizing currently available circuit technology, Main Storage 12 would be mounted for the most part on a second card.

Data, Instructions, and Input/Output (I/O) commands are transferred between CPU 9 and other units by way of two unidirectional busses, I/O Common Bus In 10, and I/O Common Bus Out 20. I/O Common Bus In 10 receives data from the input/output devices (not shown), Main Storage 12 over Bus 11, Read Only Storage 16 over Bus 17 and Local Storage Register 14 over Bus 13. Data on Bus 10 is fed to Program Register 30 and directly to Arithmetic and Logic Unit 22. It is particularly important to note that data and information on bus 10 is fed in one direction with respect to CPU chip 9, no drivers being provided for transferring data off of CPU chip 9 along Bus In 10. Main Storage 12, Local Storage Register 14, and Read Only Storage 16 have the drivers provided or sufficient power to place data on I/O Common Bus 10. In addition, Main Storage 12 has the facility to take data off of bus 10 placed thereon by Local Storage Register 14 or any input/output device over bus 13. Bus Out 20 presents the contents of Output Buffer Register 26 to Read Only Storage 16, Main Storage 12, Local Storage Register 14, and the I/O devices (not shown.) For Read Only Storage 16 and Main Storage 12, Common Bus Out 20 serves the function of an address bus, while for Local Storage Registers 14 and the I/O devices, Bus Out 20 is used as a data bus. I/O devices are addressed by a set of 6 Local storage Code Out (LCO) lines 21, which, in this embodiment, permit direct addressing of up to 64 Local Storage Registers 14 or 63 I/O devices. As previously mentioned, Bus In 10 brings micro-instructions or data from the Input/Out devices or storage. Source or destination of Bus Out 20 and Bus In 10 transfers are selected by control lines 15, which after being driven by driver 18 appear as control and clock lines 19. These lines include Local Storage Register select, Read Only Storage select, Main Storage select, Write high byte and Write low byte. An I/O device is selected by the combination of a valid device address and Local Storage Register select not being active. Validation of Bus Out 20 data transfers is timed by preceeding clock one pulses (one of lines 15). Sample Out signals indicate that LCO and select codes are valid. Sample In is a response to Sample Out to validate bus in data transfers to the microprocessor 9 or command responses from the devices. These signals together with Hold Clock In, which allows Input/Output devices to inhibit the CPU clock advance, permit totally asyncronous I/O operation.

Following is a list of the input/output interface lines 19, 20, 21, 10, and 31, including a brief note as to their function.

Bus Out 20 provides, herein, 18 lines for I/O device and Local Storage Register 14 data out, Main Storage 12 address out, and Read Only Storage 16 address out.

Bus In 10 provides, herein, 18 lines for micro-instruction from Read Only Storage 16, data in from the I/O devices and Local Storage Registers 14, and Main Storage 12 data in and data out. Poll Bus In 53 provides 7 multiplex cycle steal or 7 interrupt level request lines, to be further explained hereinafter. Poll cycle steal out 77 is one of lines 19 and is used for requesting cycle steal poll on Poll Bus In 53, in place of interrupts, by clearing poll bus in 53 interrupt priorities, and requesting cycle steal priorities. LSR Code Out (LCO) Line 21 provides, herein, 6 lines for addressing the up to 64 locations in Local Storage Register 14, for signaling the cycle steal level, or for addressing up to 63 input/output devices.

LSR Select Out includes 5 of control and clock lines 19, including LSR Select, Storage Select, ROS Select, write high byte, and write low byte. (If no high or low write specified, then a read operation is implied.)

Sample Out is one of lines 19 for indicating that a command or LSR Code Out signals are valid which will be the case during clocks 3-4 and 9-14, as will be described more fully hereinafter. Sample In (not shown) includes one common line for a selected device to respond to Sample Out, validating data which it has placed on Bus In 10, or responding to a command.

Any Cycle Steal In line 68 is used by an I/O device on the signal rise to request a cycle steal poll, and on the signal fall to indicate that its priority is valid on Poll Bus In 53.

Any Interrupt In line 70 indicates that one or more devices have an interrupt pending on Poll Bus In 53, with the priorities indicated on Poll Bus 53. Oscillator In line 59 provides a continuous square wave clock signal.

Reset In (not shown) provides a system reset and power on reset input.

Clock 1 or 9 Out is one of lines 19 for continuous timing validating previous Output Buffer Register 26 data on Bus Out 20. Clock 6, 7 Out, or Clock 14, 15 Out (for double cycle instructions), is one of lines 19 providing a continuous timing, which falls to indicate an instruction ending.

Inhibit Storage High Byte is originated by the device to write only the low byte in Main Storage 12. Inhibit Storage Low Byte is originated by the device to write only the high byte in Main Storage 12. If the device raises both Inhibit Storage High and Low, then a Main Storage read operation is implied.

Storage data select allows Main Storage 12 data to appear on Bus In 10. By inhibiting Storage Data Select, a device can provide its data (which may be the Main Storage Address) on Bus In to be written into Local Storage Register (cycle steal address register.)

Control LSR Write is originated by the device to chain data tables in Main Storage or to prevent incrementing the Local Storage Register 14 address.

Local Storage Register Code Out lines 21 addresses 0-63, together with LSR Select Line 19, Addresses Local Storage Register 14 locations 0-63. Locations 16-23 are used for interrupts, and locations 24-31 for cycle steals. LCO 21 addresses 1-63 without LSR Select Line 19, address I/O devices 1-63, with address 0 reserved for channel functions.

Referring now to Central Processing Unit 9, I/O Common Bus In 10 is fed to AbU 22 and Program Register 30. The output of Program Register 30 is fed along lines 33 to AbU 22 and to instruction decoder 62. The address portion of an instruction stored in the P register is also fed along line 31 to LSR Control Out Register 40 and to Decrement Register 38. The output of Decrement Register 38 is fed along line 39 back to P register 30 and Current Condition Register 48 and Count Register 50. The output of Count Register 50 is fed along line 51 to Decrement Register 38 and LSR Code Out Register 40. The output of Current Condition Register 48 is fed along line 49 to be preserved Condition Code Register 42. The outputs of both Current Condition Register 48 and Count Register 50 are also fed along line 43 to ALU 22. The data flow of CPU 19 includes 16 bit ALU 22 and the following operand registers:

Accumulator Register 34, which can be gated along line 35 to either side of ALU 22.

Accumulator Extension Register 36, which can be gated to either side of ALU 22 along line 37.

Total register 24 is the output buffer for ALU 22 and is loaded by Bus 23. Program Register 30, as previously noted, holds the microinstruction for decoding at Decoder 62 and execution. The contents of Program Register 30 can also be gated into ALU 22, this along Bus 33. Microinstruction Address Register 32 may have its contents gated to ALU 22 along line 29 for address modification or branch and link operations. Count Register 50 is used for shift counting and for the indirect addressing of Local Store Register 14. Its contents can be gated to ALU 22 along line 43 for performance of various operations to be described hereinafter. Output Buffer 26 holds data presented on Bus Out 28, which after being driven at drivers 18 appears as I/O Common Bus Out 20. Specific instructions to be described later save the contents of Output Buffer 26 in Local Storage Register 14 position zero which can then be inputed to ALU 22 along Bus In 10 for various operations. The output of Total Register 24 appears on Bus 25 and is gated under control of instruction decoder 62 to load Microinstruction Address Register 32, Accumulator Register 34, Extension Register 36, Error Register 46, Interrupt Mask Register 44, Count Register 50, Current Condition Register 48, and Output Buffer Register 26. The output of Interrupt Mask Register 44 is fed along lines 45 and 43 to ALU 22 and along line 45 to interrupt gate 52. The output of Error Register 46 is fed along lines 47 and 43 to ALU 22. In addition, the output of Total Register 24, the four lower bits, may be gated along line 27 to the higher order four bits of Instruction Address Register 32.

Multiplexed cycle steal and interrupt requests Common Poll Bus 53 is fed to interrupt gate 52 and priority encoder 54, the latter for cycle steals which have priority over interrupts. The output of interrupt gate 52 is fed along lines 69 to priority encoder 54. The output of priority encoder 54 is fed along lines 55 to Current Interrupt Level Register 56, to higher level interrupt test circuit 58, and to LSR Control Out Register 40. The output of higher level interrupt test circuit 58 appears on line 63 as the force higher level interrupt signal. The output of Current Interrupt Level Register 56 is fed along lines 57 to higher level Interrupt Test circuit 58 and to LSR Control Out Register 40.

Clocking signals on line 59 from a single phase oscillator are fed to four phase generator 60, the output of which is fed along line 61 to clock 66 and auxillary clock 64 the outputs of which are used in connection with instruction decoder 62 to control the operation of CPU 9, including the gating of the buses to the various operand registers and controlling the time sharing of the various buses and registers.

Figure 5:
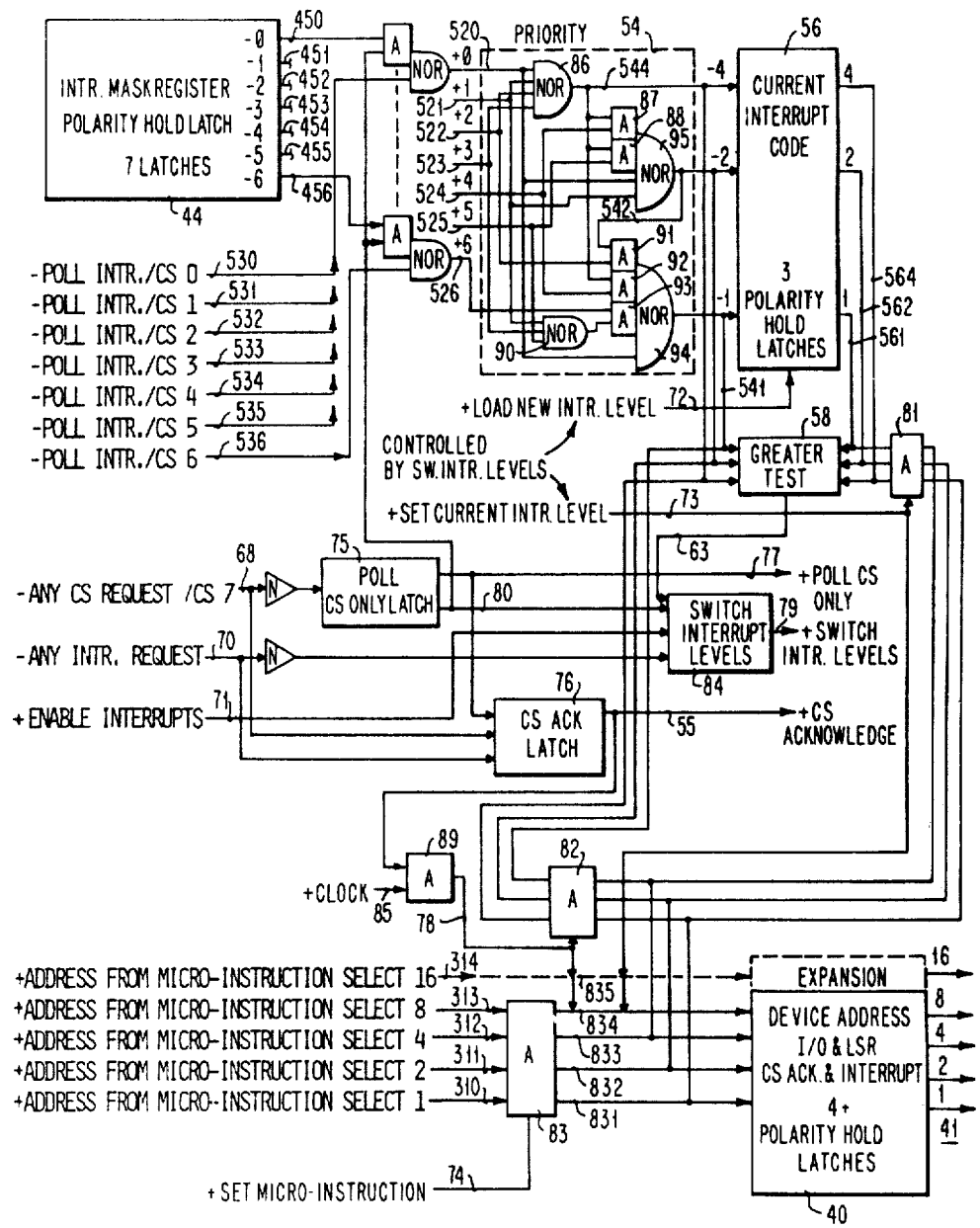
FIG. 5 is a more detailed logic diagram illustrating the integrated cycle steal and interrupt prioritized channel.

Referring now to FIG. 5 a more detailed description will be given of the cycle steal and interrupt channel of the invention. Where possible, the same reference numbers as for elements in FIG. 1 are used. In this figure, by way of example, a more detailed description is given of the various controls and latches for implementing the integrated cycle steal and interrupt prioritized channel. As will be apparent to those skilled in the art, similar and more detailed descriptions of the controls could be provided for the remainder of the system architectures set forth in FIG. 1. However, such is not essential to the understanding of the invention which relates more specifically to the architecture, the detailed controls are readily within the skill of those practicing in the art and can be provided without undue experimentation from the description of the architecture and of the timing diagrams provided. In FIG. 5, Poll Interrupt/Cycle Steal lines 530-536 represent the individual lines in Common Poll Bus 53 of FIG. 1, in negative logic. Mask 44 has as it's outputs line 450-456. Poll Cycle Steal Only Latch 75 includes as an output Reset line 80. In Interrupt Gate 52, line 450 (pertaining to the zero bit of Mask Register 44) is ANDED with Poll Cycle Steal Only Latch Reset line 80 and the result Nor'd with line 530, representing the zero bit position of Poll Bus 53; the result appears on line 520. In similar fashion, bits 1-6 of Mask Register 44 on lines 451-456 are ANDED with Poll Cycle Steal Only Latch Reset line 80 and the results Nor'd with bit positions 1-6 of Poll Bus 53 on lines 531-536, with the results on lines 521-526. Line 520 is fed to NOR circuits 86, 94, and 95. Line 521 is fed to NOR circuits 86, 90, and 95. Line 522 is fed to NOR circuit 86 and AND circuit 91. Line 523 is fed to NOR circuits 86 and 90. Line 524 is fed to AND circuits 86 and 92. Line 525 is fed to AND circuit 88 and NOR circuit 90. Line 526 is fed to AND circuit 93. The output of NOR circuit 86 appears as −4 Priority line 544 and is fed to AND gates 87, 88, and 92, to Current Interrupt Code 56 (position 4), to Greater Test 58, and to AND gate 82. The output of NOR circuit 95 appears on −2 Priority line 542 and is fed to AND gate 91, to Current Interrupt Code circuit 56 (position 2), to Compare Greater Test circuit 58, and to AND gate 82. The output of NOR circuit 90 is fed to AND gate 93. In NOR circuit 95, the output of AND gates 87 and 88 are NOR'd with lines 520 and 521. In NOR circuit 94, the outputs of AND gates 91-93 are NOR'd with line 520, and appear on line 541, which is fed to Current Interrupt Code Circuit 56 (position 1), Compare Greater Test Circuit 58, and to AND gate 82.

Minus Any Cycle Steal Request line 68 is inverted and fed to set Poll Cycle Steal Only latch 75. The set output of Poll Cycle Steal Only latch 75 is fed along lines 77 to set Cycle Steal Acknowledge latch 76. The reset output of Poll Cycle Steal Only latch 75 is fed along line 80 to inhibit the AND gates in Gate 52 and to degate Switch Interrupt Levels Latch 84, the output of which appears on lines 79 and is used to control Load New Interrupt Level line 72 and set Current Interrupt Level line 57. Negative Any Interrupt Request line 70 is fed to Cycle Steal Acknowledge latch 76 and inverted to Switch Interrupt Levels latch 84. Positive logic Enable Interrupt line 71 is fed to Switch Interrupt Levels latch 84. Minus Any Cycle Steal Request line 86 is also fed to Cycle Steal Acknowledge latch 76. The set output of Cycle Steal Acknowledge latch 76 appears as Cycle Steal Acknowledge line 55 which is ANDed at 89 with a clock pulse on line 85. Line 78 from AND 89 is fed to AND gate 82 and to the high order input bit lines 834, 835 to force into those lines a predetermined code.

Lines 310-314 represent the low order bit positions of the address portion of Program Register 30, shown as lines 31 in FIG. 1. Lines 310-314 are fed thru AND gates 83, where each one is individually ANDed with Set Microinstruction control line 74 to appear as output lines 831-835, respectively, and thence to LSR Code Out Address Register 40.

The outputs of AND gates 82 are dot OR'd to lines 831-833, the low order bit positions at the input of LCO Register 40. In addition, the output lines from AND gates 81 are also dot OR'd to the low order lines 831-833 into LCO Register 40. The outputs of Current Interrupt Code Register 56, appearing on lines 561, 562, and 564 are individually ANDed in AND 81 with Set Current Interrupt Level line 73, and also fed to Compare Greater Test circuit 58. Set Current Interrupt Level line 73, which gates the Current Interrupt Code Register 56 contents to the three low order input lines of LCO Register 40 also forces the high order input lines 834, 835 in a manner similar to that of line 78, except to a different code, so as to place on lines 41 at the output of LCO Register 40 an address to a different Local Storage Register 14 location.

Cycle steals have priority over interrupts and Any Cycle Steal Request 68 instantly cancels the normally continuous interrupt polling by setting the Poll Cycle Steal Only latch 75 requesting all devices to place their cycle steal priorities on Poll Bus 53 lines 530-536 and withdraw their interrupt requests. The disappearance of Any Interrupt Request line 70 signals microprocessor 9 that all devices have removed their interrupt priority bits on Poll Bus 53, and the disappearance of Any Cycle Steal Request 68 together with Poll Cycle Steal Only latch 75, guarantees Cycle Steal Priority 54 output lines 541, 542, 544 are ready to be set into LCO Address Register 40 together with cycle steal modifier bits formed by lines 78 in high order positions 834-835, and signals Cycle Steal Acknowledge 55 to the I/O devices. The cycle steal LSR in LSR 14 being addressed by lines 41 provides the indirect Main Storage address on Bus 13 that also may be incremented through ALU 22 to either fetch or store data from the device. The lowest priority cycle steal level requires no priority bit and its forced device Address part will be zero to allow all binary device addresses. Early in the cycle steal cycle, Poll Cycle Steal Only latch 75 is reset to revert to the continuous interrupt polling or sequential microinstruction execution; or the Poll Cycle Steal latch 75 may be set again, because it must be first reset to allow the devices to set Any Cycle Steal Request 68 again, if sequential burst mode cycle steals are required. Interrupt Mask Register 44 is always degated when Poll Cycle Steal Only latch 75 is set. Asynchronous device cycle steal requests can be controlled by microprocessor clock gating or by latching the poll bus so that the priority circuitry can be stabilized.

Having described the overall architecture of the system of the invention, a more detailed explanation of the characteristics of the various components, their operation and interaction will be given.

Input/Output Unidirectional Bus Organization

The internal ALU closed loop connection of the external input and output unidirectional busses provided by this invention allows internal processing and external I/O data modification, interrupt level switching and cycle steal address incrementing functions for sophisticated multiple level interrupts and cycle steals to share the existing ALU and data path with minimum control logic hardware and without any additional buffering registers.

This is accomplished by employing a unidirectional bus that goes in and out of CPU chip 9. Data and address are mixed on the same output bus. I/O Common Bus In 10 is the only data input bus to CPU chip 9. Main Storage 12 attaches to this bus, as does Local Store 14. While conserving the unidirectional function of Bus In 10 with respect to CPU 9, Main Store 12 uses Input Bus 10 for reading or writing data, while Output Bus 20 holds the Main Store 12 address.

Input Bus 10 also acts as an external input to one side of Arithmetic Logic Unit (ALU) 22, the output from which is set in temporary hold Total Register 24. Total Register 24 has one common Output Bus 25 that goes to every operand register inside CPU chip 9. Bus 25 is connected to Output Buffer Register 26, and from there comes out from CPU chip 9 to form I/O Common Bus Out 20, which in this example, is a two byte bus. Output Bus 20 supplies data to Local Store Register 14 and also to a number of I/O devices (not shown). On a time shared basis, Bus 20 is also the address bus for Read Only Storage 16 (for whatever writable control store may be attached, in which the instructions be to executed are stored.) Bus 20 is also the address bus for Main Storage 12. The invention thus provides a unidirectional looped busses architecture which is hybrid in nature, containing a mixture of data and address on Bus Out 20 and data and instructions on Bus In 10.

The absence of a direct processor chip data path to Main Storage 12 is solved by optional processor set result images in LSR 14 and the usage of the unidirectional input bus in the reverse direction with respect to Main Storage 12 from LSR 14. Thus, Input Bus 10 is kept unidirectional with respect to processor chip 9 by allowing Output Bus 20 on every internal data modification microinstruction to optionally set the result in the selected LSR 14 without any additional instruction or time. This innovation allows pipelining and concurrent operations on both busses, permitting Bus Out Register 26 to access the next microinstruction out of ROS 16, while the previous microinstruction is being executed with data on Input Bus 10 in overlapped mode. Similarly, Bus Out Register 26 is used to access Main Storage 12 directly and between these two addressing modes, a narrow data window transfers data to LSR 14 or I/O devices addressed by a separate six (6) bit mini address bus 21, which also signals the respective cycle steal acknowledges or switches interrupt levels. By reserving one of the 64 LSRs as a Bus Out image register, the processor chip internal data flow can be arranged around a common Arithmetic and Logic Unit (ALU), with Total Register 24 feeding all the other internal data and addressing registers and the outside world through Bus Out Register 26, which also remains preserved for program use as a fourth operand in the LSR 14 image buffer. In this manner any outside I/O device may share ALU 22 with internal processing.

The external unidirectional looped busses also permit total processor chip internal transparency for interrupt level switching and direct memory channel accessing (cycle stealing) with automatic storage address incrementing through the common ALU and data path.

The looped bus architecture of the system permits instruction execution overlapping and pipelining, examples of which will next be described.

In the first example, pipelining occurs whenever ROS instructions are on Bus In 10, which is usually at the end and the beginning of each microinstruction cycle, when at the same time I/O common Bus Out 20 starts sending data to an I/O device.

In a second example, an overlapped operation occurs when data is coming in on Bus In 10 from I/O devices or from Local Store 14, and is being processed internally through ALU 22. At that time, I/O Bus Out 20 contains the ROS 16 address, so the next sequential instruction is being accessed.

A third example, of overlapping, is when data from execution of a previous instruction is still to be stored in LSR 14, and execution of a new instruction has already commenced. LSR 14 will be loaded during clock 1 of the new instruction cycle while the new instruction execution started at clock 0. The six lines of LSR Code Out (LCO) Register 40 form an auxiliary address bus 21, 41 that is used to address 64 half words of Local Store Register 14, or up to 63 I/O devices on I/O common Bus Out 20, depending on what type of an instruction is being executed. The combination of this auxiliary mini address bus and the looped In/Out Bus 10, 20 allow operations to be done in one cycle. An I/O device can place data on Bus In 10, have that data processed through ALU 22, and see the arithmetically or logically modified data on Bus Out 20 during the same instruction, while the device is being addressed by Mini Bus 21. This is an advantage over prior art channels which require 3 instructions to do even a simple I/O data transfer without an ALU operation, as follows: First, the processor would have to send an address out on one common I/O bus. Then the device would have to respond through a demand/response interface to signal that it has recognized its own address. A second instruction would be needed for the processor to send out a command specification which would be responded to by the device. Having completed that, the processor would have to then perform a third instruction, read or write depending on which direction the data is to flow.

The I/O Common Bus Out 20, is multiplexed so that for every instruction that is executed, an overlapped operation occurs. Overlapped means that the next instruction from Instruction Store 16 is accessed, while at the same time, the processor is executing internally the current instruction. This is accomplished over the common busses by allowing, say five clock periods of the eight clocks instruction cycle for addressing ROS 16, and the other $\frac{3}{8}$ of the instruction cycle for sending data, either to Local Store Register 14 or to the I/O devices.

Main Storage 12

Main Storage 12 provides addressable and updateable memory for storing data by both the microcomputer and the I/O devices for subsequent retrieval. Data is transferred in both the read and write mode over bus 11, with respect to I/O Common Bus In 10. Lines 19 provide clocking and controls, and the address is provided by I/O Common Bus Out 20.

Whenever access is made to Main Store 12, an additional cycle is added, to make the instruction a double cycle instruction. As will be described hereinafter, during the first cycle an increment, decrement, or other address modification is done on the Main Store 12 address pointer obtained from LSR 14 or B Register 35. (This gives the ability of a stacked operation even though a stacked pointer is not used, as an automatic increment/decrement system for addressing equates to the same power as stacking pointers.) The Main Storage read or write is performed during the second cycle, after the Main Store 12 address pointer has been updated to obtain the effective new address. The address is held in Output Buffer 26 for the whole second cycle, hereinafter referred to as the main storage memory cycle, providing 8 clocks to addres Main Storage 12.

Main Storage 12 is operated in a pipelining mode, as follows: During a main storage fetch operation, data is obtained from Main Storage 12 on Bus In 10 and loaded into one of the internal registers in Microcomputer 9. At the end of the fetch operation, at clock 0, when the next instruction is about to begin, the data that has been fetched on Bus In 10 from the Main Storage 12 is gated through ALU 22 and set in Total Register 24 and thence transferred to Output Buffer Register 26. The setting of that data in Buffer 26 destroys the current Main Storage address.

Read Only Storage (ROS) 16

Sometimes referred to as executable control store means, ROS 16 stores the executable instructions comprising the microcomputer control program. These instructions are loaded onto Bus In 10, buffered in Program Register 30, and decoded at Instruction Decoder 62—which, together with the timing circuits, controls the gates, registers, and operating circuits to execute the various instructions, in a manner explained more fully hereinafter in connection with FIGS. 2-4.

ROS 16 is operated in a pipelining environment. Thus, at clock 0, which is usually the beginning of each microinstruction, the instruction is set into Program Register 30 from Bus In 10. At the same time, clock 0, data is set into the Output Buffer Register 26. Thus, data from Executable Storage 16 addressed on Bus Out 20 is taken from Bus In 10, while at the same time the address on Bus Out 20 is destroyed. Because of the inherent delays in the circuitry (including the drivers and logic stages,) pipelining occurs with these operations taking place, simultaneously.

Local Storge Register 14

Local Storage Register (LSR) 14 comprises a plurality of addressable and modifiable register locations. Data is written into LSR 14 from Bus Out 20 and read out onto Bus In 10, as addressed by LCO lines 21. Data placed on Bus In 10 may be directed to Main Storage 12 or to CPU Chip 9. Location 0 in LSR 14 is reserved for saving Buffer 26 data, under conditions to be described hereinafter.

Arithmetic Logic Unit 22

Arithmetic and Logic Unit (ALU) 22 is shared on a time multiplexed basis for processing data, microinstruction address incrementing, displacement branching, subroutine linking, main storage addressing, address modification, data fetching or storing, priority nested interrupt processing, and cycle stealing.

This is accomplished by integrating Address Register 32 with the ALU 22 data flow, and by the use of LSR 14. Address Register 32 (a simple non-incrementing polarity-hold register) time shares ALU 22 on alternating half-cycles to increment or otherwise modify the ROS 16 instruction address. Plus or minus displacement branching and linking is facilitated by this single data path into ALU 22. Since ALU 22 outputs to Output Bus 20, micro-addresses may be stored in LSR 14 as return pointers from interrupts. By the same token, since LSRs 14 gate onto Input Bus 10 and through ALU 22 to Address Register 32, new interrupt routine pointers can be loaded or previously interrupted routine pointers restored, allowing a priority nested and expandable interrupt structure to be included within the basic ALU 22 data flow. One LSR 14 location (location 0) is reserved to save and restore the Output Bus Register 26 contents.

Microprocessor 9 fetches data from Main Storage 12 through Input Bus 10 and ALU 22 for storing in its internal operand registers while Output Bus Register 26 holds the Main Storage 12 address from the selected LSR 14 or operand register (such as Extension Register 36) for simultaneous accessing and updating. Microprocessor 9 data to be stored in Main Storage 12 as the result of execution of a previous microinstruction is first sent to a selected LSR 14 register through Output Bus Register 26. The write MS microinstruction gates the LSR 14 data onto Input Bus 10 to enter Main Storage 12.

In addition, certain LSR 14 locations can also act as indirect Main Storage 12 addresses for direct I/O Device cycle steal operations, one LSR being assigned to each priority level. The I/O Devices include their own data length counter. The MS 12 address registers in LSRs 14 are automatically incremented through ALU 22 on the way to Bus Out 20, to address Main Storage 12 for writing therein the I/O data on Input Bus 10 and for reading out Main Storage 12 data, which by way of Input Bus 10 passes through ALU 22 to be made available to the I/O devices on Bus Out 20. The I/O devices receive microprocessor 9 data on Bus Out 20 and send data to microprocessor 9 on Bus In 10.

Shared ALU 22 is used in decoding emulated instructions. The operation code of the instruction being emulated is added by ALU 22 to the current instruction address in Address Register 32 to obtain a displacement pointer to a table in ROS 16 just below the current instruction being executed. In this manner, a 256 way branch is obtained to the ROS 16 instructions for executing the emulated instruction.

By sharing of Instruction Address Register 32, interrupt switching is accomplished through the same data path that exists for basic instruction execution. The instruction address value which is in Address Register 32 is stored in Local Storage Register 14 through ALU 22, Total Register 24, Internal Bus 25, Output Buffer 26, and Bus Out 20. Thus, when an interrupt occurs, the pointer to the next instruction that would have been executed on the current program priority level is preserved in LSR 14. Next, the highest level that is to be executed is determined by using the priority code which is developed in Priority Encoder 54 to generate an address at LCO Register 40. LCO Register 40 addresses the Local Storage Register 14 location that contains the pointer for the ROS 16 subroutine for that interrupt level. That pointer is read from Local Store Register 14 over I/O common bus 10 and into microcomputer chip 9 through ALU 22 to be set in Total Register 24 before being stored in Address Register 32 and Output Buffer Register 26 to address in ROS 16 the subroutine for the interrupt level that is to be executed. When the interrupt has been serviced, the current interrupt subroutine pointer is stored in LSR 14, and the address pointer for the interrupted program is fetched therefrom.

Program Register

Program Register 30 is a buffer for the current instruction and holds the instruction operation (Op) code that is being executed by microcomputer chip 13.

The count or address field of instructions stored of Program Register 30 may be gated directly to Decrement Register 38 and to LCO Register 40.

Total Register (T)

Total Register 24 is set with the output of ALU 22, and loads Bus 25, at least twice during each instruction execution cycle—once with the address of the next instruction to be executed, and once with the ALU results upon execution of the instruction specified function.

As all data from Arithmetic Logic Unit 22 is temporarily held in Total Register 24 and then is buffered in Output Buffer 26, one function can be performed on Bus In 10, while at the same time another function is being finished on Bus Out 20. This two stage buffering in the loop permits overlapped operations and pipelining.

Instruction Address Register

Instruction Address Register 32 is modified during execution of each instruction by ALU 22 to derive the address in ROS 16 of the next instruction to be executed.

Accumulator Register and Extension Register

The two working registers are Accumulator Register 34 and Extension Register 36. Herein, these registers are each 16 bits, giving the capability of 32 bits for instructions that use shifting, such as shift arithmetically, shift logically left or right, shift left and count or rotate left or right.

These registers, together with Count Register 50 and Output Register 26 are the internal registers, and are directly addressable by the microinstructions to perform internal arithmetic and logical computations. They can also be modified with one of the external Local Store Registers 14, or vice versa, with the result stored in one of the internal registers or in Local Store Register 14.

Output Buffer Register

Output Buffer Register 26 performs a dual function. Being an ALU 22 operand register it holds data that the microprogram directs to it. Also, an interrupt that forces the transfer of address pointers or any Direct Memory Access (DMA) cycle steal accesses, have to allow both the address and the data to flow through Output Buffer register 26. So that Buffer Register 26 does not loose data placed there by the microprogram, Local Storage Register 14 location 0 is reserved as an image for Output Buffer 26 whenever the microcomputer changes instructions addresses and data, whether under interrupt control or during a cycle steal operation. Subsequently, the Buffer 26 value stored in LSR 14 locaion 0 as an ALU 22 operand value can be recalled. In this manner, no back-up is required on microcomputer chip 9 for Buffer Register 26.

Power Drivers

As Bus 28 leaves chip 9, it flows through power drivers 18, the output of which is Bus Out 20. In a Large Scale Integration (LSI) chip, each driver can only drive one load. Therefore, as Bus Out 20 is a common bus going to a number of units (or loads), it has to be repowered. (In doing this repowering, an expansion on the number of channel lines developed is accomplished by coding the existing lines for an up or down level during different clocks periods of each microinstruction cycle of eight clocks.)

Decrement Register

Decrement Register 38 is used for counting in all shift, multiply, divide instructions and in the decrement, test and branch instructions. Decrement Register 38 has inputs from Program Register 30 whenever a shift operation calls for a direct shift of up to 32 positions and stores the decremented value in Program Register 30. In indirect shifts, where Count Register 50 becomes the shift count value, the same decrement by one is used as in direct shifts and Decrement Register 38 holds the decremented value before it is returned to Count Register 50.

Since the maximum shift operation that is performed in this implementation is 32, a five bit Decrement Register 38 is sufficient. However, for doing field length operation, Count Register 50 is also used as a field length count. For this operation it requires a full 8 bit decrement function. This is accomplished by cycling the 5 bit Decrement Register 38 twice, taking a four bits character from Count Register 50 first, decrementing it and storing the carry into the high order 5th position. The stored carry, if there is a carry, together with the high order 4 bit character from Count Register 50 are decremented to form the full 8 bit decremented value for loading back into Count Register 50.

LSR Code Out (LCO) Register

LSR Code Out (LCO) Register 40 addresses the I/O device or the LSR Register 14 location with respect to which data to be transferred.

Current Condition Register

The upper four bits of Current Condition Register 48 hold the four condition codes, and the lower four bits hold four programmable flags; these bits form the non-connected high byte of Count Register 50. On every arithmetic operation, the four conditions codes are set, for subsequent field linked operations. The four conditions are binary carry; twos complement overflow; twos complement minus; and the non-zero indicator-which is cumulative. The non-zero indicator, once set in any field length, will remain set until changed by a microinstruction.

Count Register

The secondary ALU operand register is Count Register 50. Additionally, it may serve as a shift counter. The shifting count originally stored in Count Register 50 is decremented for each shift of Accumulator Register 34, or of Extension Register 36, individually, or of both, when connected together for a double precision shift operation. In a shift left and count instruction, as soon as the high order bit is found, shifting is terminated and the value remaining to Count Register 50 indicates how far the shift has progressed. Therefore, in many operations that value becomes an indirect address pointer to ROS 16 or LSR 14. Thus, Count Register 50 can be loaded from internal Bus 25, and can be modified through ALU 22 with the result loaded in LCO Register 40 for addressing Local Storage 14 on Bus 21 or Input/Output devices on Bus Out 20.

For indexing address computations and for calculating effective addresses, Count Register 50 is used as a positive or negative displacement that is combined with data by ALU 22. The result is stored in Local Storage Register 14, or in any internal register on chip 9.

Preserved Condition Code and
Current Condition Code Registers

The output of Current Condition Register 48 is selectively buffered in Preserved Condition Code Register 42. The basic condition codes, set as a result of ALU operations, are: overflow, carry-borrow, cumulative not zero, minus. The current condition codes reflect the result of the most recent arithmetic microinstruction execution. All shift-left high-order bits shift into the current carry indicator. On shift left and count, the high-order bit may set the current carry indicator. Loads, stores, moves, logicals, increments, decrements, jumps and branches do not change the condition codes. Codes in registers 42 and 48 can be separately cleared, and can be individually tested by Jump instructions. In addition to these condition codes, there are four program controlled flag bits, which in combination with the current condition codes form Condition Register 48. When a microinstruction is being emulated, the correct current microlevel code is transferred to the Preserved Condition Code Register 42 to preserve the microlevel condition code of the language being emulated at the microlevel.

Interrupt Register

Interrupt Mask Register 44 contains the current mask status of the interrupt levels allowed. Interrupt Register 44 can also be modified through ALU 22, stored away in LSR 14, or restored therefrom.

Error Register

The low order bits of Mask Register 44 comprise the one byte Error Register 46, which controls and logs errors. Examples of machine check errors which can be logged are: a parity error on an instruction being fetched from ROS 16; a data error from Local Store Register 14; a Main Storage 12 parity error detected by a parity check on Bus In 10; a parity error on data being received from any one of the Input/Output devices; a channel hung condition, where an Input/Output device does not "handshake" nor allow the microcomputer to proceed to the next microinstruction; or time out errors, such as occur when an I/O instruction is issued to an Input/Output device that does not exist and the address, therefore, is non-detectable. These errors can be set in Error Register 46 and modified, saved, tested, or stored in LSR 14. Any one of these errors being set automatically by the hardware forces the highest (level 7) interrupt in the microcomputer to go to a subroutine that can either retry the operation or terminate the current function and provide signal to the operator's console.

4 Phase Generator and Clocks 60, 64, 66

A Single phase oscillator 59 is the input to four phase generator 60 that runs two clocks: Basic clock 66 and Auxiliary shifting and timeout clock 64. Basic clock 66 is a 2 phase clock that can be stopped every second clock position, with eight clock decode positions provided out of 4 overlapping latched states. Basic clock 66 runs through the eight positions every microinstruction cycle. Basic clock 66 also provides a high latch position that is used whenever the microinstruction being executed requires a double cycle, which takes place whenever Main Storage 12 is accessed; then clock 66 runs through the same eight positions, except this time the presence of the high position flipflop codes the clock 66 output as clocks 8 through 15. Auxiliary clock 64 decode provides four distinguishable time slots together with a high position flipflop which is used whenever the clock goes through a repeat cycle to indicate the maximum timeout of 2 runs through the clock, which is equivalent to one whole instruction execution cycle. Auxiliary clock 64 is used whenever a shift, multiply, or divide operation is required. During these instructions main Clock 66 is stopped at its 7th position. This permits cycle steals to proceed in the middle of shift, multiply, or divide extended operations. Auxiliary clock 64 is also used for timeouts when I/O devices are not responding or for handshake operations whenever an I/O device is found to be on Bus 10 and is trying to interchange data.

If the timeout exceeds the time allocated, then Auxiliary clock 64 times out and sets indicators in Error Register 46 to initiate the highest level, or machine check, interrupt.

Integrated Cycle Steal and Interrupt Prioritized Channel

Referring to FIG. 5 in connection with FIG. 1, the cycle steal and interrupt functions are accomplished by Common Poll Bus 53, which provides for 8 cycle steal levels or 7 interrupt request levels. Herein, Poll Bus 53 is 7 bits wide to contain the requests for 7 interrupt levels above the current executable program level, a total of 8 interrupt levels. Any I/O device can be attached to any of the 7 prioritized interrupt request lines. Polling for interrupts is continuous, except when Poll CS Only Latch 75 is set, and the cycle steal function takes place. As soon as an I/O device requires service from microcomputer 9, it places its request on the assigned priority bit 530–536 of Poll Bus 53. Multiplicity of requests will go through Priority Encode logic 54 where the highest level request is encoded into a 3 bit code (on lines 541, 542, 544) specifying one of the 8 different priority levels. The priority of interrupts is also controlled by Interrupt Mask Register 44. If Mask 44 is set to allow the interrupt, then the AND circuits in interrupt gate 52 allow that interrupt to pass on to Priority Encoder 54 so as to set the code of the currently requesting priority. This interrupt priority is compared to comparator 58 to the current level stored in 3 bit Current Interrupt Level Register 56. Current Level 56 is continuously compared with any new level from Priority Encoder 54 to see whether the new code is higher than the current one. If it is, then, the next instruction in the current chain will not be executed. Instead the current address pointer in Instruction Address Register 32 is transferred to the Local Store Register 14 location for the current level. The new, or higher, level pointer is then brought out from the Local Store Register 14 and put into Instruction Address Register 32.

The address for the interrupt routine in Local Storage Register 14 (one of the 8 possible interrupt pointers,) is derived as follows: the low order 3 bits (on lines 561, 562, 564) from Current Interrupt Register 56 are transferred under control of Gate 81 onto LCO Register 40 input lines 831, 832, 833. Set Current Interrupt Level 73 loads the high order lines 834, 835, with the remaining bits of the LCO 40 address for storing the interrupted pointer in LSR 14. The new pointer to the interrupt registers in LSR 14 is similarly loaded into LCO 40 on the high order input lines 834, 835 by Set Current Interrupt Level 73 and on the low order lines 831–833 into LCO 40 from Interrupt Register 56 after Load New Interrupt Level 72 has transferred the new Priority 54 into Current Interrupt Register 56. This changes the new LCO 40 address to that for the LSR 14 location containing a pointer to the ROS 16 subroutine for executing the interrupt for the selected level, with the address pointer arriving on Bus Out 20 and at Instruction Address Register 32 from Local Store Register 14 through ALU 22 and Total Register 24. At the end of execution of the subroutine of the new interrupt level, a Branch Out instruction is issued. This instruction restores the pointer of the originally interrupted program. Since the subroutine that serviced the interrupt also resets the interrupt, the request for the same interrupt should not be present. If another interrupt comes up on the same level or a higher level, the program will not return to the original program position, but will continue on to handle the newer interrupt priority request. This provides for a full nesting of up to 8 interrupt levels. In addition, for each level, there can exist a multiplicity of sublevels. Once a given interrupt level is detected, an Interrupt Level Status Word (ILSW) instruction is issued to all I/O devices, and one of the 16 devices, currently requesting service on any particular interrupt level, must identify itself. (In this manner 16 sublevels can be obtained for each one of the 8 levels for a total 128 sublevel interrupts.) The Interrupt Level Status word that is received into one of the microcomputer registers can be used to determine which of the 16 devices on that level is requesting service. This is done by one Shift Left and Count instruction. The first bit in the highest order position will stop the Shift Left and Count instruction and the remaining count in Count Register 50 will indicate the position of the subroutine for that particular device.

Common Poll Bus 53 is also used for cycle stealing. However, it first has to be cleared of all interrupt requests. Any Cycle Steal Request line 68 is set to a negative logic level by a device that is requesting a cycle steal. Once that line sets Poll Cycle Steal only latch 75, immediately Poll cycle Steal Request line 77 is brought up, the devices are required thereby to remove their interrupt requests from Poll Bus 53 until the cycle steal function has been concluded. As soon as common Interrupt Request line 70 and Any Cycle Steal Request line 68 are dropped by all the devices, CS Acknowledge latch 76 is set at the next clock 0, indicating that Poll Bus 53 contains the cycle steal priority for the requesting device, which goes directly into the Priority Encoder 54 (bypassing Interrupt Mask gate 52.) This produces 3 bits of an LCO Priority address out of Priority Encoder 54, which is gated at AND 82 by AND 89 line 78 (the clocked output of Latch 76) into LCO register 40—together with the fixed higher order bits addressing pointers in LSR 14 for the cycle steal level which is used as a Main Storage 12 address, to either obtain or store data into Main Storage 12 under full control of the I/O Device-even to the extent of just setting the upper or lower byte (instead of the two bytes in the halfword mode.) Current Interrupt Level Register 56 in this mode stays undisturbed because the interrupt level (whether it is the program level or any higher level being executed) is just delayed by that one cycle steal instruction breakin. As just described, a memory access is initially addressed by a pointer from LCO register 40, including three low order bits signifying which of the 8 cycle steal levels is currently acknowledged, and the high order bits giving a displacement to the local store 14 halfword register holding the indirect memory address. This address reads out from Local Store 14 onto Bus In 10, and is incremented through ALU 22 before being set into Buffer Register 26. During Main Storage 12 memory access time, the incremented address on Bus Out 20 can be written back updated into its Local Storage Register 14 cycle steal register or prevented to be written by the acknowledged I/O device so as to preserve the cycle steal address unchanged. After an access time, data is read out from memory 12 on Bus In 10 if the I/O device allows the readout selection of Main Storage 12 and inhibiting the write pulses which are control pulses 19 out of the microcomputer. The I/O device can place its own data on Bus In 10 to be written into Main Storage 12. Thus the device has full control of the increment or non-increment function through the integrated ALU and full control of the read or write mode of the operation. In write mode, once that operation has been completed the Input/Output device can still see its own data on Bus Out 20 during the following clock 1. In read mode, the data read out on Bus In 10 flows through ALU 22 into Total Register 24 and Output Buffer 26 to be available to all of the devices on Bus Out 20. The only I/O device that will pick up that data in the read mode is the device that will recognize the cycle steal level code on the six LCO address lines 21. The processor then reverts back to its normal instruction execution or to the interrupt routine handling that had been suspended for this one DMA (or cycle steal) cycle.

Description of Timings

Figure 2B:
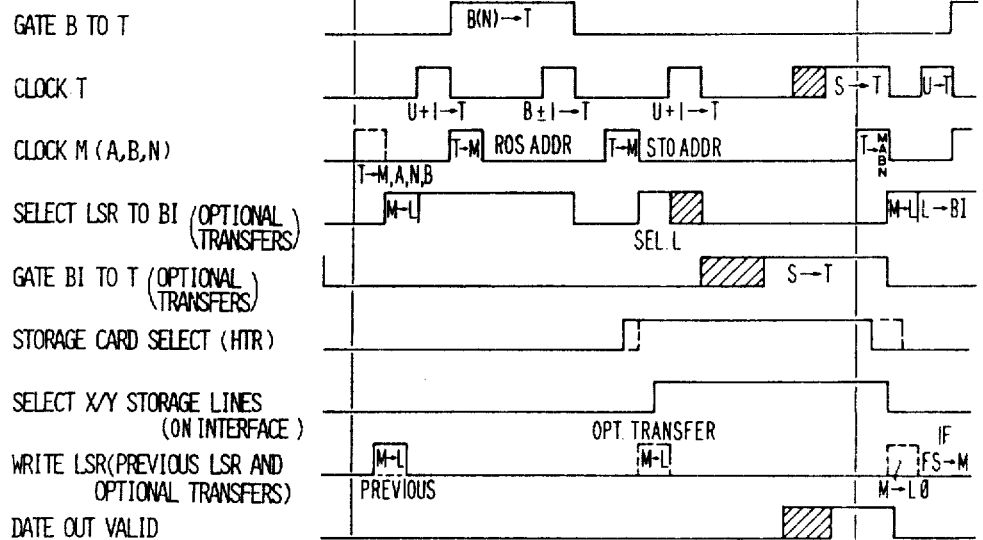
Figure 2B:
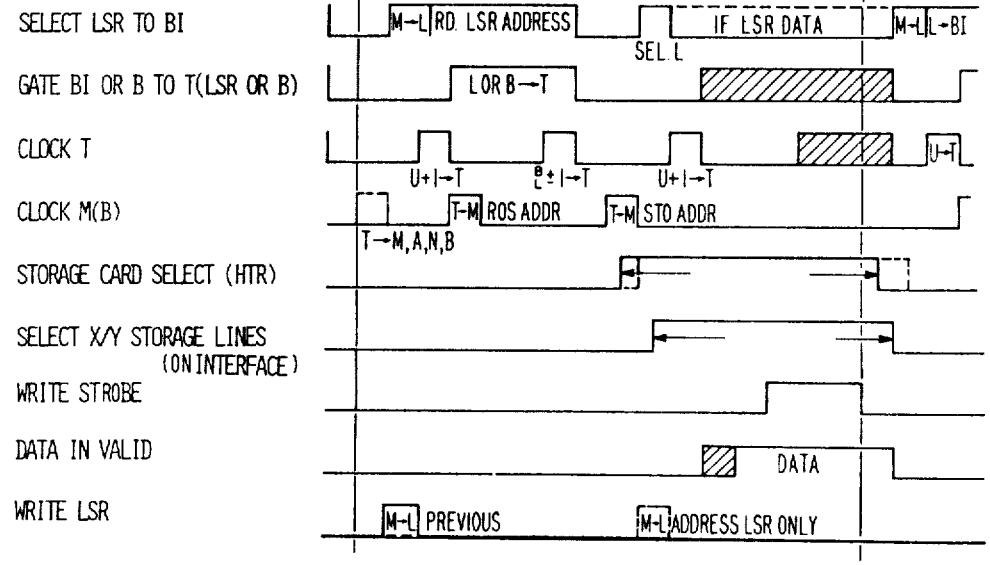
Figure 3:
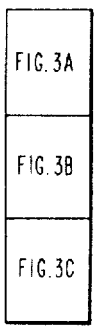
Figure 3A:
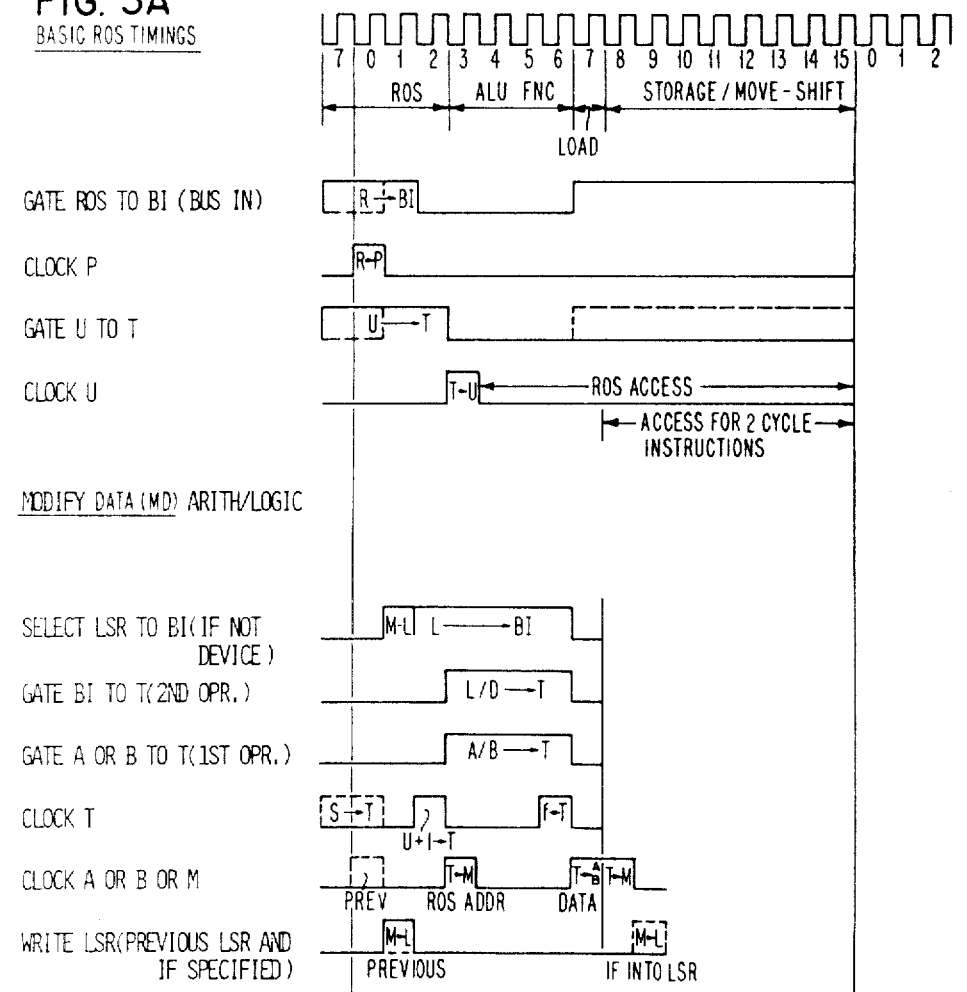
Figure 4C:
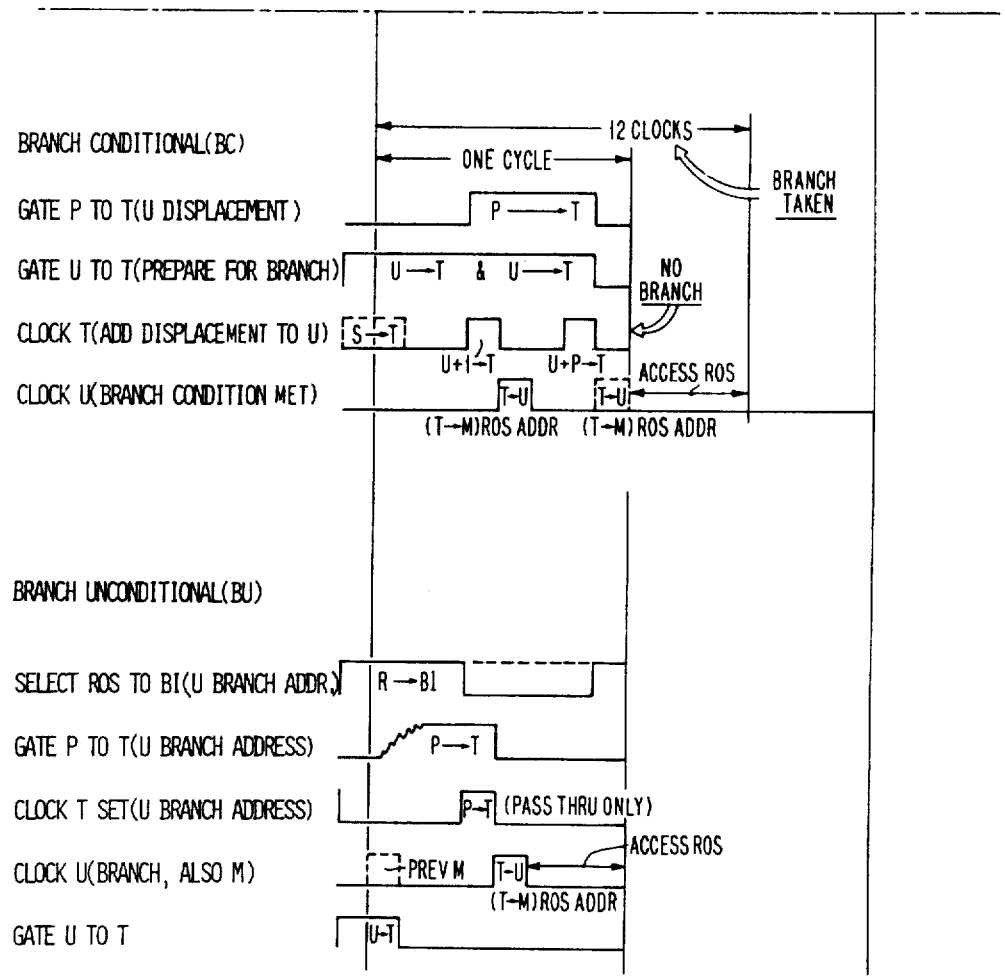

Referring now to FIGS. 2-4, a brief description will be given of the timings for executing the microinstructions. As all instructions have similar execution timing characteristics, a general description is first given, and will be followed by a more detailed description of each instruction type.

The clocking cycle is divided into eight different times known as clocks 0 through 7. Clocks 8 through 15 are repeats of clocks 0 through 7, and the only time that these clocks appear is during a Main Storage 12 operation, including DMA. The basic instruction time of eight clocks is divided into two parts for utilization of ALU 22. During clock 7 through clock 2, ALU 22 is devoted to incrementing or otherwise modifying instruction Address Register 32. Clocks 3 through 6 are utilized for processing by all the microinstructions. In this manner, ALU 22 is used continuously on a 50% basis for instruction execution and 50% for instruction pointer update. The basic window during which the address for ROS 16 appears on Bus Out 20 starts at clock 3 when the computed new address pointer is loaded from ALU 22 into Total Register 24 and transferred to the Output Buffer Register 26. This address stays unchanged until the following clock zero when Buffer Register 26 is changed to contain the data for either Local Storage Register 14 or any I/O device on I/O common Bus Out 20.

Clock 0 starts every microinstruction by loading the instruction from Read Only Storage 16 into Program Register 30. This buffering in Program Register 30 permits execution of that instruction while the ROS 16 address is changed at clock 3, as described previously, to access the next microinstruction.

Total Register 24 is set at clock 2 with the instruction address and at clock 6 with the data processed by ALU 22 in executing the instruction. During clock 3, the next instruction address is set into Buffer 26 for loading on Bus Out 20.

If the microinstruction requires that data be written into Local Storage Registers 14, it is written during clock 1 of the instruction following which that data was computed, and it is written from Output Buffer 26 through Drivers 18 directly into the Local Storage 14 location selected by the six LCO 40 lines. In the same manner data can be transferred to an I/O device by loading it into Output Buffer 26 at clock 0 and with a signal 19 during clock 1 indicating that the data on Bus Out 20 is valid. This data changes at the beginning of clock 3 when the Read Only Storage 16 address appears in Output Buffer Register 26. Any data that is coming into CPU 9 on Bus In 10 for storing or modification has to arrive and be valid at ALU 22 during clocks 3, 4, 5 and 6—this being the time during which the ALU performs the process specified by the instruction being executed. For the same reason data from LSR 14 is placed on Bus In 10 for processing by CPU 9 at clock 2. At clock 3, which allows for signal delays, the data is available for the ALU function.

Data from Local Storage Registers 14 is placed on Bus In 10 starting at clock 2. It is not gated into ALU 22 until the beginning of clock 3, because from clocks 7 through 2 ALU 22 is used for updating Instruction Address Register 32. At the beginning of clock 7, ALU 22 is transferred back to the address incrementing function, having completed its basic microinstruction processing function.

Referring to FIG. 2, for microinstruction dealing with the Main Storage 12, particularly fetching data from Main Storage 12 into one of the registers of CPU 9, the second cycle (clocks 8-15) has a slight variation in that the next microinstruction is fetched from ROS 16 during clock 8 even though execution of the current instruction continues through clock 15 and into the following clock 0, at which time data from Main Storage 12 is finally set into the specified register of CPU 9 or sent to an I/O Device. In this case (following every instruction accessing Main Storage 12) a new instruction is not gated into Program Register 30 on the following clock 0 as it has already been trapped at the previous clock 8 of the Main Storage 12 instruction. Also, the window for updating Instruction Address Register 32 is shortened and does not start in equivalent clock 15, but two clocks later at clock 1 and only lasts through clock 1 and clock 2, as that update is just a direct transfer through ALU 22 without any modification (as that has already taken place during clocks 7-10 of the previous Main Storage instruction.)

The Main Storage write instruction writes the data into Main Storage 12 during the second phase of the instruction during clocks 13 through 15.

Referring to FIG. 3, for decimal arithmetic, during the first four clocks, ALU 22 performs the binary equivalent function and stores the intermediate carries for each of the packed decimal digits. A repeat ALU 22 pass is then taken for another four clocks (controlled by auxillary clock 64) for "six" correct to obtain the pure decimal result.

Referring to FIG. 4, whenever a branch is performed, where the branch address is loaded at clock 7 (such as the branch-on-condition, a multiway table branch is decoding an Op-code from a target language which is being emulated, or when a branch and link is returned by restoring the original address from Local Storage Register 14 into Instruction Address Register 32) then an additional four clock cycles of Auxiliary Clock 64 are added to allow time for ROS 16 accessing, since in each of these cases a branch has changed the precomputed look ahead address from the previous instruction.

In shift operations, Auxiliary Clock 64 takes two clocks for each single bit shift in either Accumulator Register 34 or Extension Register 36; or, it takes 4 clock periods (which is half as much as the basic microinstruction execution time) for shifting one position of the double precision Accumulator and Extension Registers 34 and 36: these are logically connected together as one double precision register by alternatively cycling through ALU 22.

For jump operations the basic ALU 22 processing time (clocks 3 through 6) perform the test for equals, greater, or test under mask; the result of the test is not known until the beginning of clock 7, and at that time a jump decision is made. If no jump is to take place then the next instruction that has been accessed continues without any delay. If a jump condition is met and one instruction is to be skipped, the basic microcomputer clock takes another dummy microinstruction cycle during which it increments for the next microinstruction without executing the microinstruction jumped.

The branch unconditional is a very fast instruction because no conditions need to be tested, therefor no auxiliary clock delays are present. Furthermore, the 12 bit branch address is directly passed through ALU 22 and loaded into Total Register 24 at clock 2. From Total Register 24 it passes to Instruction Address Register 32 and Buffer Register 26 at clock 3, thus synchronizing with the normal look ahead accessing of instructions.

Instruction Set

The basic machine instructions are optimally designed for emulation, and are stored in ROS 16. Often called micro-instructions, these may be referred to simply as instructions in the following discussions, except perhaps when a distinction between the emulated target machine instructions and the microprocessor instructions is to be emphasized.

Common to all instructions are a parity bit in the most significant bit position (bit 0) and a 3-bit operation code (bits 1-3). The remaining bits are subdivided into fields of varying lengths, the nature and function of which depends on the type of instruction. Since there are only eight distinct operation codes, some of the instruction types are distinguished by decoding additional modifier bits. Most of the instructions are highly encoded and specify or imply a large variety of distinct operations, many of which are performed sequentially. These sequential operations are coordianted by a very tightly designed set of timing patterns as set forth in FIGS. 2-4.

Referring now to FIGS. 2-4, the 11 basic instruction categories will be described. The symbols used in the timing charts to refer to the registers are as follows:

| Symbol | Registers |
| --- | --- |
| A | Accumulator |
| B | Extension |
| T | Total |
| P | Program |
| U | Instruction Address |
| N | Count (Shift Count) |
| M | Output Buffer (Bus Out) |
| I/O | Input/Output Device |
| E | Error |
| I | Interrupt Mask |
| C | Current Condition Code |
| PCC | Preserved Condition Code |
| L | Local Storage Register |

Each of the instructions may be defined by a 16 bit, including 1 parity bit, instruction code. Bits 1-3 define the operation code, and these codes are listed below together with the instruction category:

| Instructions | Mnemonic | Operation Code |
| --- | --- | --- |
| Control | CO | 000 |

-continued

| Instructions | Mnemonic | Operation Code |
|---|---|---|
| Logical Write | LW | 001 |
| Logical Shift | LS | 001 |
| Logical Move Count | LM | 001 |
| Modify Data | MD | 010 |
| Modify Operand | MO | 010 |
| Fetch Storage | FS | 011 |
| Immediate Modify | IM | 100 |
| Jump Conditional | JC | 101 |
| Branch Conditional | BC | 110 |
| Branch Unconditional | BU | 111 |

Control Instruction

Figure 3B:
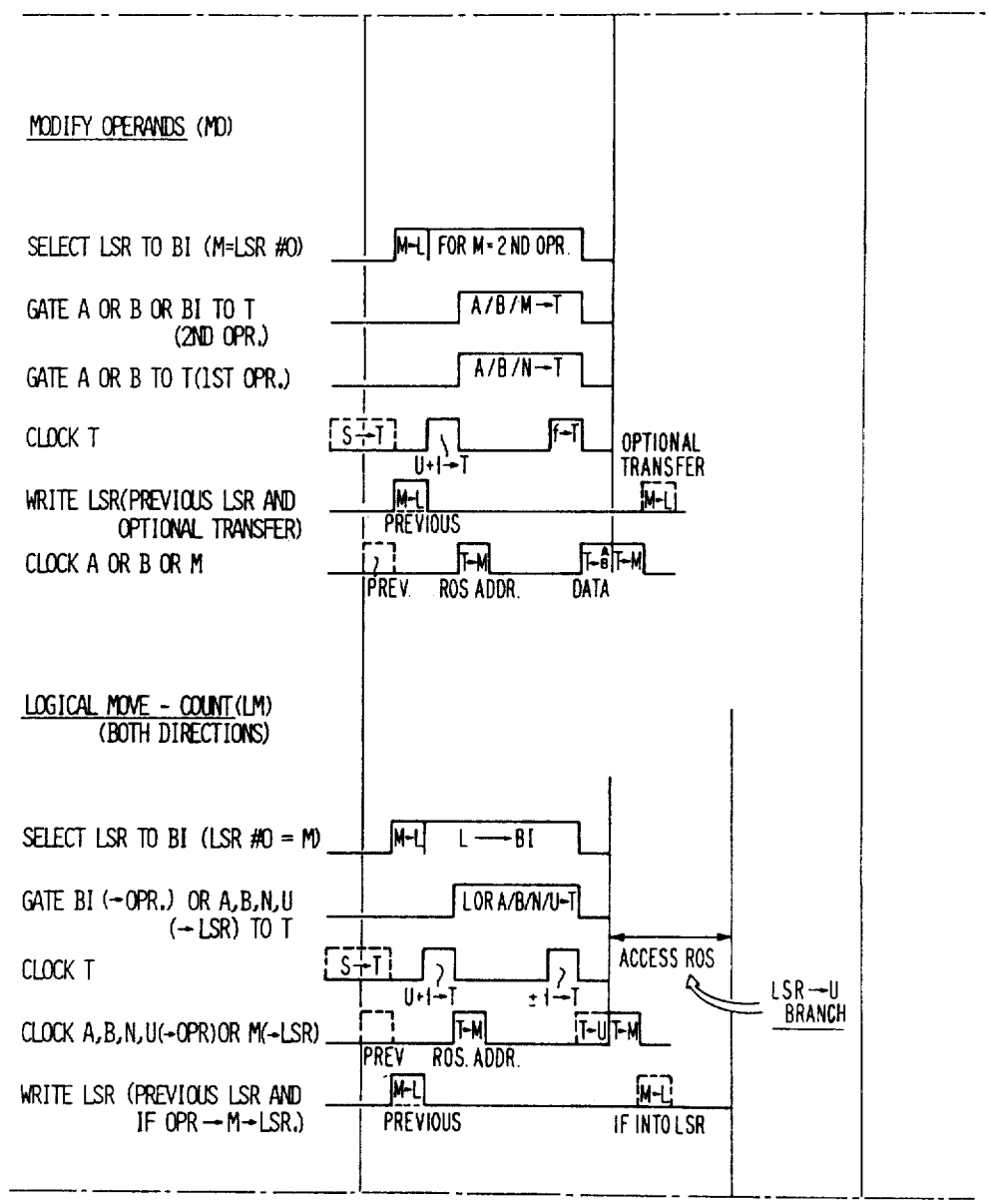
Figure 3C:
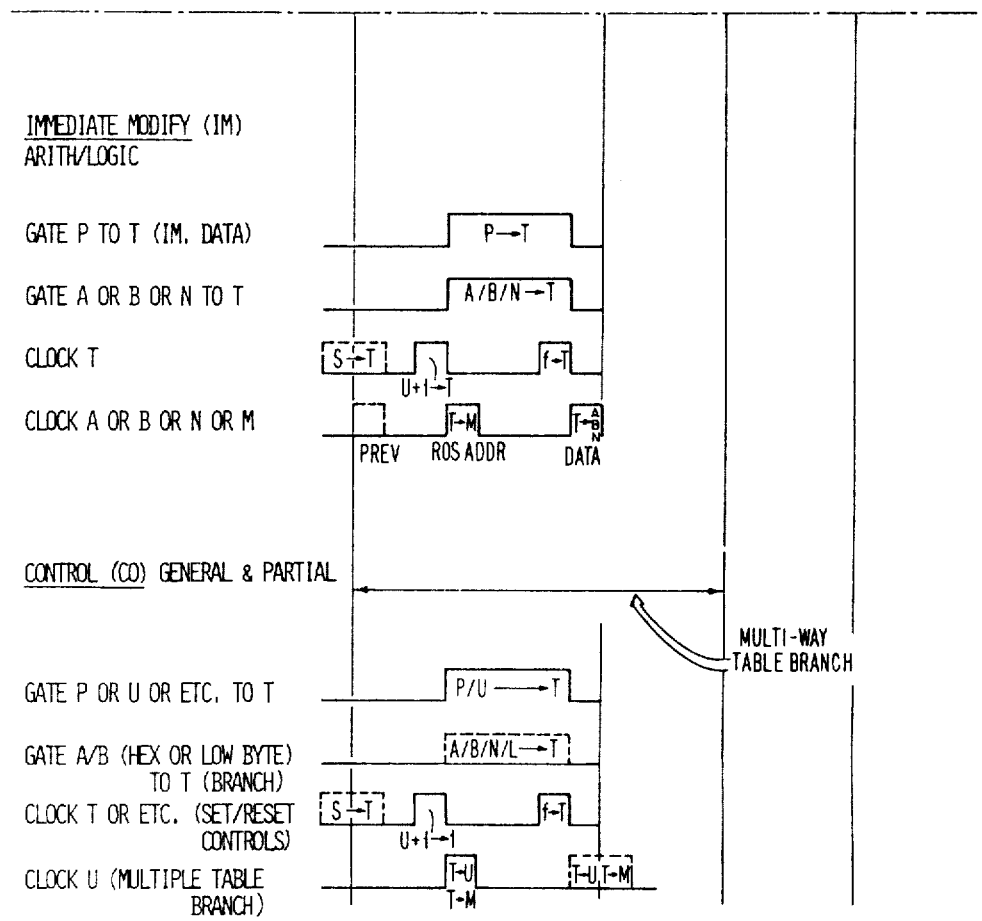

Referring to FIG. 3C, the timing diagram for the control instructions is set forth. Control instructions may be provided, for example, for the following operation: for transferring data, for indirect execution, for setting the interrupt mask, for setting paging, for table branching, for optional mode selections, for operation on preserved condition code and current condition code, for program flags and for I/O transfers. By way of introduction, a number of uses of the control instructions will be described.

A number of the control instructions relate to interrupt processing. One such instruction enables an interrupt to take place after the completion of every microinstruction, while another provides for an interrupt window during which any pending interrupts will be honored and the interrupt switch made. After that, the interrupts are disabled until the window is encountered again.

Other control instructions relate to ROS I/O paging. The four bit ROS 16 page is an internal page specified within Instruction Address Register 32. This page register is used whenever direct branching across the 4 K boundaries of directly addressable ROS 16 instructions locations is required. ALU 22 will increment past the 4 K boundaries all the way through 64 K halfwords of ROS 16. Also, the interrupt switching pointers provide full 16 bit addressing, and not merely 12 bits. Therefore, it is also capable of addressing full 64 K complements of instructions.

Other control instructions control the four flag bits. They are the lower four bits of C Register 48, that together with the four condition codes form the non-connected upper byte of Count Register 50. The flag bits can be set by the programmer for different indications and can be used as switches in the subroutine. The flag bits can be stored or restored together with the condition codes and the lower byte Count Register 50 into and out of LSR 14 on interrupt switching.

The remaining control instructions deal with the condition code. There are two levels of condition codes, each having four bits indicating binary carry, twos complement overflow, two complement high order minus bit, and cummulative non-zero. The Current Condition Code Register 48 upper four bits change on every arithmetic operation as well as on a shift left logical, shift left and count, multiply, and divide. For other instructions of the logical nature, the registers themselves can be tested for zero or non-zero, ones or mixed ones and zeros. The Preserved Condition Code Register 42 stores the same four bits as Current Conditions Code 48, except it is under microprogram control for transferring and accumulating the equivalent of condition codes of the macro language being emulated.

By way of example, the following control operations are used in the embodiment of the microcomputer system of the invention.

Control operation load immediate data (KBUS) operates to load the data field of the instruction into the Output Buffer 26 high order bit positions. Local Storage Registers 14 register 0 data bits 0–4 are loaded into the low order bit positions of Buffer Register 26, and the contents of Buffer Register 26 are written into Local Storage Registers 14 register 0.

Control Operation Transfer LSR Data to I/O Device (KLSR) provides a four bit field for addressing Local Storage Register 14 registers 0–15. Data from the addressed Local Storage Register 14 is transferred to Output Buffer 26 and onto Bus Out 20. A six bit field of the KLSR instruction provides a device address, which is loaded into LCO register 40 for addressing Input-/Output devices 1–63.

Control instruction Transfer Immediate Data to I/O Device (KLCO) loads part of Output Buffer Register 26 with immediate data from the instruction code, with the remainder loaded from selected Local Storage Register 14 register 0 bits. Data in other bit positions of the instruction code are loaded to LCO Register 40 for the device address. The contents of Output Buffer Register 26 are loaded into Local Storage Register 14 register 0.

Control operations Set Interrupt Mask (KILM) provides the interrupt mask bits for Register 44, with a one in a bit position enabling an interrupt for the corresponding level. One bit in the instruction code specifies whether to save or set the interrupt mask bits.

Control operations are provided for setting paging of Read Only Storage 16. KLAP has a field for specifying pages 0–15, and KRAP specifies page 16. Each page represents 4,096 half words.

Control operations for table branching specify the register or register portion to be added or Exclusive OR'd to Instruction Address Register 32 to yield the next sequential address in ROS 16 for execution. These are set forth below:

| Mnemonic | Add to IAR 32 |
|---|---|
| KIAL | Accumulator Register 34 low byte |
| KIXL | Extension Register 36 low byte |
| KIBL | Output Register 26 low byte |
| KIEL | Bus In 10 low byte |
| KIAH | Accumulator Register 34 low hex |
| KIXH | Extension Register 36 low hex |
| KIBH | Output Register 26 low hex |
| KIEH | Bus In 10 low hex |
| KIAZ | Accumulator Register 34 low zone |
| KIXZ | Extension Register 36 low zone |
| KIBZ | Output Register 26 low zone |
| KIEZ | Bus In 10 low zone |
| KIAS | Accumulator Register 34 low six bits |
| KIXS | Extension Register 36 low six bits |
| KIBS | Output Register 26 low six bits |
| KIES | External Bus In 10 low six bits |

Control operations branch out (KILB), transfers the current Instruction Address Register 32 contents to the Local Storage Register 14 register for the current interrupt, resets the current interrupt, samples for a new interrupt, and transfers to Instruction Address Register 32 the contents of the Local Storage Register 14 location for the new interrupt level.

Control operation KSIE provides three 2 bit fields (II, EE, and SS) for specifying the interrupt code (enabling an interrupt or sampling the interrupt and then disabling further interrupts,) specifying error mode, and specifying Main Storage 12 byte address (no change; reset, or set byte mode.)

Code 01 in one or more of each of the interrupt code (II), error mode (EE), and Main Storage byte address (SS) fields of the KSIE control operation are reserved to specify additional control operations, in which the interrupt code, error mode, or main storage byte address mode characteristics of the KSIE control instruction are preserved or replaced as set forth in the table below. If the control code shows II, EE, or SS, then the KSIE control instruction defines the operations specified by the interrupt code, error mode, or main storage byte address byte mode, respectively:

| Mnemonic | Instruction Code Field | Description |
|---|---|---|
| KPIE | IIEE01 | Reset preserved condition code (not overflow) |
| KPSJ | II01SS | Reset preserved condition code (all) |
| KCSE | 01EESS | OR current condition code to preserved condition code and reset current condition code. |
| KTPI | II0101 | Reset current condition code and preserved condition code (not overflow) |
| KCPS | 0101SS | Transfer current condition code to preserved condition code and reset current condition code |
| KCPE | 01EE01 | Transfer current condition code to preserved condition code (except OR overflow) and reset current condition code. |

Control operation KNTC performs the function KTPI. In addition, controls are set to perform a KCSE following the next instructions if it is an arithmetic operation. Flag 4 is also reset "even" or set "odd" on the result.

Control instruction KPCC performs a direct transfer of the preserved condition code to the current condition code.

Control instruction KFCC specifies whether Current Condition Code Register 48 is to be saved or set, and specifies the positions to be saved or set: carry-borrow, overflow, minus, cumulative, not zero, or flags 1 through 4.

Main Storage Instructions

The Logical Write (LW) and Fetch Storage (FS) instructions comprise the main storage instruction grouping. With these instructions, described in FIG. 2, data can be read from Main Storage 12 and placed into the four basic internal data registers: Accumulator Register 34, Extension Register 36, Count Register 50, and Output Buffer Register 26.

Data that is fetched from Main Storage 12 is addressed by Extension Register 36, or by one of the Local Storage Registers 14, as specified in the instruction address. The address can be initially updated with an increment or a decrement to provide a continuously moving pointer to Main Storage 12 on Common I/O Bus Out 20, or it can be oscillated at an effective address by adding to a specified pointer the N Register block 50 displacement (positive or negative).

The halfword or byte addressing mode can be specified for the storage instructions. The IBM 1130 addresses its main storage data in a halfword mode. The IBM 360/370 and the IBM System/3 use the byte addressing mode, even so, it may fetch one or two bytes in any one access. Since the architecture of the System/3 instruction set allows the instructions to be either 3, 4, 5, or 6 bytes, the instructions themselves are not aligned on the halfword boundaries. Therefore for ease of emulation, the microcomputer of this invention provides halfword alignments by byte twisting the data from Main Storage 12 in ALU 22 so as to align any specific byte in one position, such as, for example, the instruction operation code to always appear in the low order byte.

Logical Write Instruction

As previously noted, there is no direct path for data from CPU 9 to Main Storage 12. This is because Bus Out 20 is used as the Main Storage address bus and therefore is not available for data. Bus In 10 is bidirectional only with respect to Main Storage 12. The reason for not permitting it to be bidirectional with respect to CPU chip 9 is to conserve area on CPU chip 9, since the output drivers required to place data onto Bus 10 would use up a large amount of area and power on chip 13, and consequently, are not included.

The four Logical Write instructions select halfword, low byte, or high byte modes; and store in Main Storage 12 data taken from an Addressed Local Storage Register 14 location or from an I/O device.

Logical Write from LSR

In the first Logical Write instruction, data from Local Storage Register 14 location 1 is written into the Main Storage 12 location addressed by one of Local Storage Register 14 positions 0-63. An LSR 14 register 1-63 is selected and the contents incremented or decremented by one, or left unchanged before setting Output Buffer Register 26 to address Main Storage, with the updated address being rewritten into the above selected Storage Register 14 location 1-63. Specification of Local Storage Register 14 location 0 as the address source selects Count Register 50 as the indirect address of the Local Storage 14 register to be used as the source for the address for Main Storage 12. A storage write cycle is performed with the data obtained from Local Storage Register 14 position 1 that has been switched on to Bus In 10. As an option, the address modification code (two bits of the op code), if set to 10 will select low byte or high byte only to be written into Main Storage 12. If a Control Instruction has previously set byte storage addressing mode, all plus or minus address updates will function as plus or minus 2 and the high byte selection will force a −1 address update (low byte does not modify the address) with the resulting address, even or odd storing the high or low byte, respectively. Also, the original Output Buffer Register 26 contents will be selected from Local Storage Register 14 location 0.

Logical Write from LSR 0-63 Addressed by Extension Register 36

The second instruction is similar to the first one, except that the data to be written into Main Storage 12 is obtained from a selected Local Storage Register 14

(position 0-63) and the Storage Address for Main Storage 12 is obtained from Extension Register 36. The low or high byte operations described above are also available.

Logical Write from I/O Device 0-63 Addressed by same LSR 0-63

The third instruction is similar to the first logical write instruction described, except that the same LSR 14 (0-63) code that selects the address register also selects the I/O device (O-63), to provide the data on Bus In 10 to be written into Main Storage 12.

Logical Write from I/O Device 1-63 addressed by Extension Register 36

The fourth instruction is similar to the second Logical Write Instruction, described above, except that the data to be written into Main Storage 12 is provided by the selected I/O device (1-63) on Bus In 10.

Fetch Storage

The Fetch Storage (FS) instructions are designated for halfword mode. For setting storage byte addressing in place of halfword addressing, see the Control instructions. (Current Condition 48+Count 50 or Interrupt Mask 44+Error 46 are always used together in byte mode and the upper byte is not zeroed on a Fetch Storage Command.)

Load from Storage to CPU 9 Registers with LSR 14 Address (Halfword Address Mode)

An LSR 14 register (1-63) is selected and the contents modified by 0, 1 or OR 1 before setting Output Buffer 26 (not LSR 14 location 0) Register to Address Main Storage 12. If modification was 1 the Output Buffer Register 26 contents are updated into the selected register in LSR 14. A storage read cycle is now performed and Storage 12 data out is switch onto Bus In 10 to be set into the Accumulator 34, Extension 36, Buffer 26, or Count 50/Error 46 operand registers selectively. Interrupt 44+Error 46 registers may be selected by KSIE Control Instruction in place of Condition 48+Count 50 registers. (Count 50/Error 46 register has only the low byte.) LSR 14 location 0 selects indirect addressing of LSR 14 from operand Count Register 50 low-order 6 bits. Also, the original Output Buffer 26 data will be selected from LSR 14 location 0.

With BUS Operand Address (Halfword Address Mode)

This instruction is similar to the next instruction described except that Output Buffer (meaning LSR 14 location 0) Register 26 is used in place of Extension 36 Addressing Register and the auxiliary Bus Out 20 address transfer acts as a halfword move of Buffer 26 to LSR 14 locations 1-63 or the Bus Out 20 address update into LSR 14 location 0.

With XTN Operand Address (Halfword Address Mode)

Extensin Register 36 contents are modified by 0, ±1, or by adding the Count 50 operand displacement before setting the Output Buffer 26 (not LSR 0) Register to address Main Storage 12. The Buffer Register 26 updated value is rewritten into Extension Register 36. A read Main Storage 12 cycle is started. An auxiliary transfer is performed (before the Main Storage 12 data is available) provided that LSR 14 selection is from 1 to 63, not zero. Optionally, the Address Register 32 contents are written into the selected LSR 14 register. Finally, the Main Storage 12 data is switched onto Bus In 10 to be set into Accumulator 14, Extension 36, Output Buffer 26, or Count 50/Error 46 operand registers, selectively, as in the first FS instruction. Also, the original Output Buffer 26 data will be selected from LSR 14 location 0.

Load from Storage to I/O Devices (Halfword Address Mode)

This instruction is similar to the one above except that Address Register 32 can be selected from Extension Register 36 or the LSR 14 location equal to the Input/Output device selected and updated. The Main Storage 12 data is set into Buffer Register 26 (not LSR 0), from where it is sent to the selected Input/Output device (1-63) with a Sample Out pulse, and no auxiliary transfers take place. Device 0 selects indirect addressing of the device from the operand Count Register 50 low-order 6 bits. Also, the original Buffer 26 data will be selected from LSR 14 location 0.

Arithmetic and Logical Instructions

Referring to FIG. 3 the arithmetic and logical instructions are modify data (MD) and modify operand (MO). The arithmetic include add with or without carry, and substract. They can be performed in binary twos complement or decimal packed (unsigned one-digit in every hex 4 bits of data.) The arithmetic functions can be performed within the microcomputer between the internal registers (Accumulator Register 34, Extension register 36, Count Register 50, and Output Buffer Register 26.) In addition, Accumulator Register 34 or Extension Register 36 can be arithmetically combined with one of the 64 Local Store Registers 14 with the result stored either in one of Local Store Registers 14 or in Extension Register 36. All the arithmetic instructions performed within microcomputer 9 registers can be performed in halfword mode, upper byte alone mode, lower byte mode, or low order 4 hex bits mode. The other bits in each of these configurations remains unchanged.

The logical instructions include AND, OR, and Exclusive-OR. These operations, when performed on the internal registers alone, as in the arithmetic mode, can be performed in the hex low four bits, the low byte, the high byte, or the halfword mode. Similar functions can also be performed with Local Store Register 14, except all these external-to-internal or internal-to-external logical functions can only be carried out in the halfword mode.

Modify Data

By the Modify Data command Accumulator Register 34 or Extension Register 36 can be modified in place with the contents of a Local Storage Register 14 that remains unchanged. Also, a specified Local Storage Register 14 can be modified with the contents of Extension Register 36, with the Extension Register 36 remaining unchanged and the result set in the selected Local Storage Register 14. In addition, any Input/Output device can be selected to supply data on Bus In 10. This data can be modified with the data in Extension Register 36 and the result returned to the same Input/Output device by setting data into Output Register 26 (not LSR 0) and thence to Bus Out 20. It also goes into Local Storage Register 14 position 0 only if the address portion of the modified data instruction producing 0 data is produced on Bus In 10. By using the OR function, a move is made from Extension Register 36 to Output Register 26. By using the AND function, Output Register 26 is set to all zeros.

The modifying function that can be specified by the Modify Data instruction are: add binary with or without carry or decimal packed with carry, subtract binary or decimal packed with borrow (subtraction cannot be from a selected Local Storage Register 14 or Input/Output device, except in reverse), AND, OR, and Exclusive OR. Specifing Local Storage Register 14, position 0 selects indirect addressing of the Local Storage Register 14 or Input/Output device from the low order 6 bits of Count Register 50.

Modify Operand

With the Modify Operand (MO) instructions, Accumulator register 34 can be modified in place with Extension Register 36, or Extension Register 36 can be modified in place with Accumulator Register 34, that remain unchanged. Also, Accumulator Register 34 or Extension Register 36 can be modified in place with Count 50/Error 46 Register. Also, Extension Register 36 can be modified in place with Output Buffer Register 26. With Extension Register 36 zero, an OR function in place with LSR 14 location 0 (Output Buffer Register 26) produces an Output Buffer Register 26 move to Extension Register 36 and also to LSR 14 (position 1-15).

The modify functions are the same as in the Modify Data (MD) instructions except that Move functions between any combination of Accumulator 34, Extension 36, or Count 50 and Error 46 operand registers are added, and subtraction cannot be from Count 50/Error 46 operand registers except in reverse. In addition, all the above functions can be performed in either halfword, high byte only, low byte only or low hex digit only, except that the high byte of Count 50/error 46 operand register does not exist. After each of the above functions are completed, an auxiliary halfword result (high byte of Count 50/Error 46 = Current Condition 48/interrupt Mask 44) move can be performed to a selected LSR 14 location 1-15.

Logical Shift

Referring to FIG. 4, Shift operations can be executed either left or right, one bit at a time. The length of the shift depends on the length of the register. Accumulator Register 34 and Extension Register 36 each can be shifted from one to sixteen positions. For multiply and divide, when double precision is required. Accumulator Register 34 becomes the high order register of Extension Register 36, and together they form a coupled 32 bit register that can be shifted from 1 to 32 positions in any of the following-modes: shift right arithmetic, shift left and count, shift left logical, shift right logical, shift left and rotate, and shift right and rotate. Faster operations which are equivalent to a rotate of the 16 bit registers eight positions, otherwise known as byte twists, can be performed in one microinstruction cycle.

Immediate Modify

The Immediate Modify (IM) instructions are illustrated in FIG. 3C.

A byte of data from Program Register 30 (op bits 8-15) is combined with the low order byte of Accumulator Register 34, Extension 36, or Count 50/Error 46, selected by a previous KSIE Control instruction. For the Accumulator 34 or Extension 36 operand registers, combining functions are Subtract, Load, OR, AND, XOR, ADD. Any carry or borrow generated by ADD or Subtract is propagated into the high-order byte. For the Count 50/Error 46 register, combining functions are OR, AND, LOAD, ADD. For Add or Subtract functions the immediate byte data is incremented or decremented by one, and any incoming carries will be ignored with a new condition code set.

Jump Conditional

Referring to FIG. 4B, the Jump instruction is performed whenever a test is false. The tests, performed against a mask byte in the instruction on the low order 8 bits of a selected register, are as follows: mask equals the low byte, mask is greater than the low byte, mask bits are tested for on bits in the low byte and the remaining non-selected bits are ignored, or mask is tested for the OFF bits in the low byte and the remaining bits are ignored. Condition Register 48 can be tested under mask with ON/OFF bits selected and a jump on any combination of conditions. Condition Register 48 has 4 condition codes and 4 program controlled flag bits. If the test is false, the next instruction is skipped. Also, the high hex zone digits in Accumulator 34 or Extension 36 operands can be tested for all zeroes.

Branch Operations

The branch operations are Branch Conditional and Branch Unconditional. They can be performed to any 4K range of Executable Storage 16. By storing the Current Instruction Address Register 32 plus 1 into one of Local Store Registers 14 before taking the branch unconditional a branch and link operation is performed. The reverse, taking the address so stored in Local Store Register 14 and moving that address pointer backinto Instruction Address Register 32, performs the return to the subroutine from which branch and link was originally taken.

A second grouping of branch instructions performs the multiway table branching which can be done on the low order 4 hex bits in the microcomputor registers, on the next four which are the zone 4 bits while ignoring the low order 4 or 6 bits, or on the total 8 bits, thus providing a full 256 table branch from which the 8 bit Op-code can be decoded by a Branch Unconditional instruction out of the table.

A third group of branch instructions provides signed displacement branching on 16 different conditions; such as: register zero or not zero, register negative or not negative. Displacement branching is performed by taking the 8 bit displacement from the instruction and adding it is a signed 16 bit number to Current Instruction Address Register 32.

Other instructions allow displacement branching based on Count Register 50 being decremented by 1 or by 16 and branches taken if the result is all zeros or not all zeros, if the low order 4 bits are all zeros or not all zeros, if the low order 4 bits are all ones or not all ones, if the high order 4 bits are all ones or not all ones, and so forth.

Logical Move Count

Referring to FIG. 3B, Logical Move Count (LM) instructions selectively move the contents of a specified register 1-63 in Local Storage Register 14 and to the Instruction Address Register 32, Accumulator Register 34, Extension Register 36, or the Combined Current Condition and Count Registers 48, 50. During this transfer, the value may be modified by 0, −1, or +1, (except for moves of single bytes into Accumulator Register 34 or Extension Register 36), and the value as modified is written back into the selected register 1-63 of Local Storage Register 14. Conversely, the specified register (Instruction Address Register 32, Accumulator Register 34, Extension Register 36, or the combined Current Condition and Count Registers 48, 50) may be moved into the selected location 1-63 of Local Storage Register 14 with modifications by 0, +1, or −1 (except for moves of single bytes of data from Accumulator Register 34 or Extension Register 36.) The byte moves can specify either the high or low byte of Accumulator Register 34 or Extension Register 36, but no modification is performed on moves between Accumulator Register 34 or Extension Register 36 and the specified register in Local Storage Register 14. The Instruction Address Register 32 value is composed of the 16 bit address for Read Only Storage 16. The Current Condition Register 48 can only be selected as the upper byte of the combined Current Condition and Count Registers 48, 50 if no increment or decrement is specified. Also, Interrupt Register 44 and Error Register 46 will be substituted for the Current Condition and Count Registers 48, 50 if set by the KSIE control instruction previously described. When the Logical Move Count Instruction specifies Location 0 in Local Storage Register 14, indirect addressing of Local Storage Register 14 is selected from the low order 6 bits of Count Register 50, except selection of the Current Condition and Count Registers 48, 50 as the destination or the source register for the move operation will move data to or from Current Condition and Count Register 48, 50 from or to Local Storage Register 14 Location 0.

Input/Output

There is no distinct I/O instruction as such; direct-program-controlled transfers of data or control messages to or from an I/O device are performed by the following instructions: Fetch Storage, Logical Write Storage, Modify Data, and Control.

The Fetch Storage instruction transfers data from MS 12 to an I/O device via the control data path of buses 23, 25, 28. The Logical Write instruction transfers data directly from an I/O device to MS 12 via Bus In 10 without passing through processor 9, utilizing the address from Extension Register 36 or any of the LSR 14 registers. The Modify Data instruction brings data from an I/O device, performs an ALU 22 operation on it with Extension operand 36, and returns the result to the I/O device through Output Buffer Register 26. A Control instruction and be used to output data to a device either from a specified LSR 14 (0-15) or from an immediate data field in the instruction. Other Control Instructions can transfer data from any I/O Device to Accumulator Register 34, Extension Register 36, or LSR 14 Registers 0-15.

In all cases, the device address, specified by the instruction either directly in the address field or indirectly as the contents of Count Register 50, is transmitted to the I/O device by LCO 40 lines 21, 41, which are also used to address LSR 14. The transfer is synchronized by a pair of handshaking signals, Sample In and Sample Out. These signals together with Hold-Clock-In permit asynchronous operation of the I/O transfers, independent of line length and device operation delays.

While the invention has been described with respect to preferred embodiments thereof, it is apparent that the foregoing and other changes may be made thereto without departing from the invention.

What is claimed is:

1. A computing apparatus, comprising arithmetic logic means for performing arithmetic and logical operations on information and address data;
   a unidirectional internal data bus;
   first buffer means for storing output data including address and information data from said arithmetic logic means for selective forwarding to a plurality of operand registers including an accumulator register over said unidirectional internal data bus, the unidirectional internal data bus but receiving data only from said first buffer means;
   second buffer means for storing said output data gated thereto over said internal data bus and for loading said output data onto an output bus; said output data including address and information data for selective communication to a plurality of devices; and
   input bus means for communicating data from said plurality of devices to said arithmetic logic means.

2. The apparatus of claim 1, wherein said internal data bus communicates both information and address data to said output bus means.

3. A computing apparatus comprising:
   at least one external device means selectively for storing data and for evaluating arithmetic and logical modifications to data;
   output bus means for communicating data and address signals to said external device means;
   a plurality of internal operand register means for storing data;
   arithmetic logic unit means responsive to a first one of said plurality of internal operand register means for arithmetically or logically modifying the stored data; and
   internal bus means responsive to said arithmetic logic unit means for communicating all modified data to said output bus means and to a second one of said plurality of internal operand register means; the results of all arithmetic logic unit operations on internal data being made available on said output bus means and communicated to said external device means optionally for storage or for use in the evaluation of the operation of said arithmetic logic unit.

4. The apparatus of claim 3, further comprising single port register means at the output of said arithmetic logic means for loading all data on said internal bus means and for buffering said second selected operand register means.

5. In a computing system having an arithmetic logic unit (ALU); a single ALU output port register; an address register; a bus out register; at least one operand register; an internal bus connecting said port register to said address register; said bus out register, and said operand register an instruction register; and an instruction decoder; the method of overlapping three sequential program instruction accessing and executing operations, comprising the steps of simultaneously
   storing in said bus out register the results of executing a first instruction on data selectively from an operand register in said ALU;

loading a second instruction into said instruction register from a location addressed by said address register and decoding the second instruction; and operating said ALU selectively to increment, decrement, or load an address through said port register into the address register.

6. A microprocessor apparatus, comprising:

arithmetic and logic unit means (ALU) having an input and output;

first register means for buffering the output of said ALU;

an internal bus;

a plurality of operand registers selectively providing the input to said ALU, including second register means for loading signals onto an output bus; and third register means for storing instruction address signals;

said ALU being operable during a first portion of an execution cycle for modifying said instruction address signals, and during a second portion of an execution cycle for executing an instruction to generate output data signals;

said first register means being responsive to the output of the ALU during said first portion of an execution cycle for transferring updated instruction address signals to said internal bus for communication to said second and third register means, and being responsive to the output of the ALU during said second portion of the last-mentioned execution cycle for transferring said output data signals to said internal bus for communication to at least one of said operand registers; and said second register means being operable for transferring said modified instruction address signals and said output data signals received on said internal bus to said output bus during respective portions of an execution cycle, with at least one of said respective portions overlapping with the first portion of a subsequent instruction execution cycle.

7. The microprocess apparatus of claim 6, further comprising:

means for detecting a request for an interrupt operation;

storage register means responsive to an interrupt operation for storing current instruction address signals loaded onto said output bus from an interrupted operation;

whereby the current instruction address signals loaded onto said output bus are stored as a return pointer to the interrupted operation.

8. The microprocessor apparatus of claim 7, further comprising an input bus for communicating signals to said ALU; said means for detecting being further adapted to detect a plurality of requests for interrupt operations to be nested according to their priority; and control means for gating the contents of said storage register means onto said input bus for loading through said ALU into said third register means;

whereby new interrupt pointers may be loaded and previously interrupted routine pointers may be restored to said third register means thereby enabling priority nested interrupt processing.

9. The microprocessor apparatus of claim 7, further comprising:

an input bus for communicating signals to said ALU;

means for detecting a request for a cycle steal operation;

main storage means addressed by said output bus for receiving data from and loading data onto said input bus;

said ALU being selectively operable to modify main storage address data received over said input bus from said storage register means for loading by said second register onto said output bus; and said ALU being further selectively operable to receive data from said input bus for loading by said second register onto said output bus;

whereby said ALU is selectively operable to modify main storage address and to transfer data from said main storage means to said output bus for communication to an input/output device requesting a cycle steal operation.

10. The microprocessor apparatus of claim 6 further comprising:

fourth register means for storing the operation code of an emulation instruction to be executed; and said ALU being further selectively operable to combine said operation code with the contents of said third register;

whereby a displacement pointer is obtained for addressing a subroutine for executing said emulation instruction.

11. A microprocessor apparatus including an instruction store and an arithmetic and logic unit (ALU) having an input and an output disposed on a chip having a unidirectional looped input bus and output bus, comprising:

internal looped bus means for communicating data signals from said ALU output of said output bus, said looped bus means including:

first register means for storing the output of said ALU; and second register means for storing the output of said first register means;

address register means for storing the location in said instruction store of an executable instruction;

control means operable during a first portion of an instruction execution cycle for operating said ALU to calculate a next instruction address and loading the result through said first register means into said address register means; and operable during a second portion of an instruction execution cycle for operating said ALU to execute an instruction received on said input bus and loading the execution result into said first register means.

12. The apparatus of claim 11 wherein said control means is further operable to load said next instruction address from said first register means through said second register means onto said output bus.

13. The apparatus of claim 12 wherein said control means is further operable to load said execution result from said first register means through said second register means onto said output bus means.

14. The microprocessor apparatus of claim 13 wherein said execution results include operand values selectively addressable to one of a plurality of internal operand registers by an instruction on said input bus, wherein said second register means is an operand register, and further comprising third register means operable for storing operand values addressed to said second register means by said instruction; whereby execution results which are operand values addressed to said second register means by said instruction and loaded onto said bus out are temporarily buffered in said third register means, and next instruction addresses and execution results addressed to the other operand registers and placed on said output bus by said second register are not buffered in said third register means.

15. A method for operating a microprocessor apparatus to overlap execution of consecutive instructions, said microprocessor apparatus having an arithmetic and logic unit (ALU) disposed in serial with first and second buffer registers along an internal bus interconnecting unidirectional looped input and output buses, and further having an executable instruction store and a main storage, each said store and main storage addressed by address signals on said output bus, an instruction address register, and a plurality of operand and other internal and local registers, the method comprising the steps of:

(1) operating said ALU during a first portion of an instruction execution cycle to calculate the address in said executable instruction store of a second instruction;

(2) operating said first buffer register to load the address of said second instruction into said instruction address register and through said second buffer register onto said output bus to access said second instruction;

(3) operating said ALU during a second portion of an instruction execution cycle to process a first instruction received over said input bus from said executable instruction store to provide a result; and (4) operating said first buffer register to load said result into at least one internal or external register, and through said second buffer register onto said output bus whereby the execution of consecutive instruction is achieved by overlapping accessing of said second instruction with ALU processing of said first instruction.

16. The method of claim 15, comprising the further steps of:

(5) operating a first one of said local registers to store the instruction address loaded onto said output bus; and (6) operating said first local register to load the instruction address stored therein onto said input bus for communication along said internal bus through said ALU and first buffer register to said instruction address register and to said second buffer register for addressing said executable instruction store on said output bus.

17. A computing apparatus, comprising:

arithmetic and logic means (ALU) selectively operable during an execution cycle for computing a next instruction address and an execution result;

a plurality of operand register means including an output register means for storing execution results:

instruction register means for storing an instruction for execution by said ALU, and for specifying the operand register means to receive the execution result;

said output register means selectively operable during each said execution cycle and responsive to said ALU for loading each said instruction address and each said execution result onto a bus out;

local register means operable, when said output register is specified by said instruction as the operand register, for storing the execution result loaded onto said bus out.

* * * * *